United States Patent
Totaka et al.

(10) Patent No.: US 7,781,664 B2
(45) Date of Patent: Aug. 24, 2010

(54) STORAGE MEDIUM STORING MUSIC PLAYING PROGRAM, AND MUSIC PLAYING APPARATUS

(75) Inventors: Kazumi Totaka, Kyoto (JP); Junya Osada, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 369 days.

(21) Appl. No.: 12/000,389

(22) Filed: Dec. 12, 2007

(65) Prior Publication Data

US 2009/0090234 A1    Apr. 9, 2009

(30) Foreign Application Priority Data

Oct. 9, 2007   (JP) ............................. 2007-263639

(51) Int. Cl.
G10H 1/00     (2006.01)
G10H 1/18     (2006.01)
(52) U.S. Cl. ............................. 84/615; 84/609; 84/610; 84/616; 84/649; 84/650; 84/653; 84/654
(58) Field of Classification Search ................ None
See application file for complete search history.

(56) References Cited

U.S. PATENT DOCUMENTS 5,777,251 A     7/1998   Hotta et al.
2005/0016362 A1   1/2005   Nishitani et al.

FOREIGN PATENT DOCUMENTS

| EP | 0 903 169 | 3/1999 |
| EP | 0 974 954 | 1/2000 |
| EP | 1 130 571 | 9/2001 |
| JP | 2003-205174 | 7/2003 |
| WO | 98/58364 | 12/1998 |

*Primary Examiner*—Marlon T Fletcher
(74) *Attorney, Agent, or Firm*—Nixon & Vanderhye P.C.

(57) ABSTRACT

The game apparatus stores music data which indicates at least a pitch of each of sounds which form a melody of a predetermined piece of music and an output timing to output each of the sounds. The game apparatus sequentially detects, among the sounds included in the music data, a target sound which is a sound an output timing of which comes after start of playing by the music data. In the case where a first input is performed when or after the output timing of the target sound comes, the game apparatus outputs the target sound. On the other hand, in the case where a second or later input is performed after the output timing of the target sound comes, the game apparatus determines a pitch of an ad-lib sound, and outputs the ad-lib sound at the determined pitch.

25 Claims, 17 Drawing Sheets

Fig. 11

| OUTPUT TIMING | TONE COLOR | PITCH | QUANTITY |
|---|---|---|---|
| 192 | 11 | "RE" OF OCTAVE "2" | 48 |
| 240 | 11 | "LA" OF OCTAVE "2" | 96 |
| 336 | 11 | "MI" OF OCTAVE "2" | 24 |
| 360 | 11 | "FA" OF OCTAVE "2" | 24 |
| ⋮ | ⋮ | ⋮ | ⋮ |

Fig. 12

| AREA | CHORD TONE |
|---|---|
| AREA A | MI-SO-SI-RE |
| AREA B | RE-FA-LA-DO |
| AREA C | SO-SI-RE-MI-FA |
| ⋮ | ⋮ |

Fig. 13

| AREA | SCALE TONE |
|---|---|
| AREA a | DO-RE-MI-FA-SO-LA-SI |
| AREA b | LA-SI-DO#-RE-MI-FA#-SO#-LA |
| ⋮ | ⋮ |

STORAGE MEDIUM STORING MUSIC PLAYING PROGRAM, AND MUSIC PLAYING APPARATUS

CROSS REFERENCE TO RELATED APPLICATION

The disclosure of Japanese Patent Application No. 2007-263639, filed on Oct. 9, 2007, is incorporated herein by reference.

BACKGROUND OF THE INVENTION

1. Field of the Invention

The present invention relates to a storage medium storing a music playing program and a music playing apparatus, and more particularly, to a storage medium storing a music playing program and a music playing apparatus for making a player perform an input to music to perform a playing operation.

2. Description of the Background Art

A game apparatus which is disclosed in Patent Document 1 (Japanese Laid-Open Patent Publication No. 2003-205174) is a game apparatus which makes a user (a player) perform a button operation at a predetermined timing thereby to play a piece of music. In the game apparatus, an operation position indicator and a note indicator are displayed on a screen, and the note indicator moves on the screen. In the case where the player performs an input with respect to a predetermined button at a timing when the note indicator comes to the position of the operation position indicator, the game apparatus outputs a predetermined sound. The note indicators are displayed in sequence, each note indicator passes through the position of the operation position indicator at a predetermined timing. Thus, the player performs an input at an appropriate timing when each note indicator comes to the position of the operation position indicator, thereby causing the game apparatus to output a sequence of sounds (a melody).

In the above game apparatus, unless the player performs an input at a predetermined timing, namely, at a timing when the note indicator comes to the position of the operation position indicator, a sound is not outputted. Thus, in the above game apparatus, an operation to be performed by the player is only an operation of pressing a predetermined button at a predetermined timing. In addition, even when the player precisely performs an input, only a predetermined melody is outputted. Thus, in the conventional music playing game, only a predetermined melody is outputted by performing a predetermined operation. For example, the player cannot play a piece of music so as to arrange a predetermined melody by freely performing a playing operation. As described above, in the conventional music playing game, a degree of freedom for the player to play a piece of music is small, and the fun of the game is low.

SUMMARY OF THE INVENTION

Therefore, an object of the present invention is to provide a storage medium storing a music playing program and a music playing apparatus which allow the player to play a piece of music freely.

The present invention has the following features to attain the object mentioned above. It is noted that reference numerals and supplementary explanations in parentheses are merely provided to facilitate the understanding of the present invention in relation to the later-described embodiment, rather than limiting the scope of the present invention in any way.

A first aspect of the present invention is directed to a computer readable storage medium which stores a music playing program (a game program 60) executed by a computer (a CPU 10, or the like) of a music playing apparatus (a game apparatus 3) for making a player play a melody of a predetermined piece of music. The music playing apparatus stores music data (63) which indicates at least a pitch of each of sounds which form the melody of the predetermined piece of music and an output timing to output each of the sounds. The music playing program causes the computer to execute a detection step (S10), an input acceptance step (S13), a first sound output step (S24), an ad-lib sound determination step (S28, S29, S30, S51), and a second sound output step (S32). At the detection step, the computer sequentially detects, among the sounds included in the music data, a target sound which is a sound an output timing of which comes after start of playing by the music data. At the input acceptance step, the computer accepts an input from an input device (a controller 5) of the music playing apparatus. At the first sound output step, the computer outputs the target sound in the case where the input accepted at the input acceptance step is a first input when or after the output timing of the target sound detected at the detection step comes. At the ad-lib sound determination step, the computer determines a pitch of an ad-lib sound as an arbitrary sound in the case where the input accepted at the input acceptance step is a second or later input after the output timing of the target sound detected at the detection step comes. At the second sound output step, the computer outputs the ad-lib sound at the pitch which is determined at the ad-lib sound determination step.

In a second aspect of the present invention, at the ad-lib sound determination step, the computer may determine the pitch of the ad-lib sound based on at least one of a pitch of the target sound and a pitch of a next target sound an output timing of which comes after the target sound.

In a third aspect of the present invention, the ad-lib sound determination step may include a nominee setting step (S28, S29, S30), and a selection step (S51). At the nominee setting step (S28, S29, S30), the computer sets at least a nominee for the pitch of the ad-lib sound based on at least one of the pitch of the target sound and the pitch of the next target sound. At the selection step, the computer selects a pitch, from the nominee which is set at the nominee setting step, as the pitch of the ad-lib sound.

In a fourth aspect of the present invention, the nominee setting step may include a nomination range setting step (S28) for setting a nomination range based on a first pitch which is the pitch of the target sound and a second pitch which is the pitch of the next target sound. At this time, the nominee for the pitch of the ad-lib sound is set within the nomination range which is set at the nomination range setting step.

In a fifth aspect of the present invention, at the nomination range setting step, the computer may change the nomination range from a range including the first pitch to a range including the second pitch as time proceeds during a target period from a time when the output timing of the target sound comes to a time when the output timing of the next target sound comes.

In a sixth aspect of the present invention, the nominee setting step may include a center pitch calculation step (S43), and a width setting step (S44). At the center pitch calculation step, the computer calculates a center pitch which is a center of the nomination range such that the center pitch changes from the first pitch to the second pitch as time proceeds during the target period (see FIG. 17). At the width setting step, the computer sets a width of the nomination range. At this time, at the nomination range setting step, the computer determines the nomination range from the center pitch and the width of the nomination range.

In a seventh aspect of the present invention, the nominee setting step may include a nomination range setting step for setting as a nomination range a range which includes a first pitch which is the pitch of the target sound. At this time, the nominee for the pitch of the ad-lib sound is set within the nomination range which is set at the nomination range setting step.

In an eighth aspect of the present invention, at the nomination range setting step, the computer may set as the nomination range a range which has a predetermined width with the first pitch as a center thereof.

In a ninth aspect of the present invention, the nominee setting step may include a nomination range setting step for setting as a nomination range a range which includes a second pitch which is the pitch of the next target sound. At this time, the nominee for the pitch of the ad-lib sound is set within the nomination range which is set at the nomination range setting step.

In a tenth aspect of the present invention, at the nomination range setting step, the computer may set as the nomination range a range which has a predetermined width with the second pitch as a center thereof.

In an eleventh aspect of the present invention, at the nomination range setting step, the computer may set the nomination range such that the width of the nomination range is gradually decreased as time proceeds during a target period from a time when the output timing of the target sound comes to a time when the output timing of the next target sound comes.

In a twelfth aspect of the present invention, at the nomination range setting step, the computer may keep the width of the nomination range constant during a predetermined time period from the time when the output timing of the target sound comes.

In a thirteenth aspect of the present invention, at the nomination range setting step, the computer may change the nomination range such that the width of the nomination range is decreased by a constant amount or at a constant rate with respect to elapse of time.

In a fourteenth aspect of the present invention, the music data may include data which indicates a tone color of each sound forming the melody of the predetermined piece of music. Also, the music playing apparatus further stores output possible range data (66) in which an output possible range is associated with each tone color of sounds to be outputted. At this time, at the nomination range setting step, the computer sets the nomination range so as to be within an output possible range of an output possible range data which is associated with a tone color of the target sound.

In a fifteenth aspect of the present invention, the music playing apparatus may further store chord data (64) which indicates a chord sound used in the predetermined piece of music. At this time, at the ad-lib sound determination step, the computer determines the pitch of the ad-lib sound by selecting a sound from the chord sound of the predetermined piece of music which is defined in the chord data.

In a sixteenth aspect of the present invention, the music playing apparatus may further store scale data (65) which indicates a scale sound of the predetermined piece of music. At this time, at the ad-lib sound determination step, the computer determines the pitch of the ad-lib sound by selecting a sound from the scale sound of the predetermined piece of music which is defined in the scale data.

In a seventeenth aspect of the present invention, the music playing program may cause the computer to further execute a determination step (S31) and a third sound output step (S33). At the determination step, the computer determines whether or not a predetermined time period has elapsed after the target sound or the ad-lib sound is last produced until an input is accepted at the input acceptance step during a period when the same target sound is detected at the detection step. At the third sound output step, in the case where the determination result of the determination step is negative, the computer outputs an ad-lib sound at a pitch which is determined based on a pitch of the target sound or the ad-lib sound which is last outputted. At this time, the second sound output step is executed only in the case where the determination result of the determination step is positive.

In addition, the present invention may be provided by a form of a music playing apparatus which has the same function as a music playing apparatus which executes the steps in the above first to seventeenth aspects. It is noted that in the music playing apparatus, processing of each of the above steps may be executed by a CPU which executes the music playing program, or a part or all of the processing of each of the above steps may be executed by a dedicated circuit which is provided in the music playing apparatus.

According to the first aspect, in the case where a first input is performed when or after the output timing of the target sound comes, the target sound is outputted at the pitch according to the melody of the musical score which is indicated by the music data. In the case where a second or later input is performed, the ad-lib sound is outputted at the pitch which is determined at the ad-lib sound determination step. Therefore, according to the first aspect, the player can perform an input a plurality of times with respect to a sound, and in addition, can output a sound at a pitch which is not the pitch according to the melody of the musical score by performing a second or later input with respect to the sound. In other words, the player can arrange the melody of the musical score indicated by the music data, and can freely play the piece of music.

According to the second to fifth aspects, in the case where a second or later input is performed after the output timing of the target sound comes, the pitch of the sound to be outputted is determined based on the pitch of the target sound and the pitch of the next target sound. Thus, the pitch of the sound to be outputted can be selected so as not to be too high or too low with respect to the target sound and the next target sound. Therefore, even in the case where the pitch of the sound to be outputted is determined at random, the target sound can be outputted so as to provide a playing result which is natural following the melody of the musical score indicated by the music data.

According to the sixth aspect, the nomination range can be easily changed from a range including the first pitch to a range including the second pitch as time proceeds. Since the nomination range with the center pitch as a center thereof is set, the nomination range is set such that a high sound side and a low sound side thereof with respect to the center pitch become even. Thus, at the second sound output step, the pitch of the sound to be outputted can be selected from the high sound side and the low sound side with respect to the center pitch in a well-balanced manner.

According to the seventh aspect, in the case where a second or later input is performed after the output timing of the target sound comes, the pitch of the sound to be outputted is selected from the nomination range including the pitch of the target sound. Thus, the pitch of the sound to be outputted can be selected so as not to be too high or too low with respect to the next target sound. Therefore, even in the case where the pitch of the sound to be outputted is determined at random, the target sound can be outputted so as to provide a playing result which is natural following the melody of the musical score indicated by the music data.

According to the eighth aspect, the nomination range with the first pitch as the center thereof is set, so that the nomination range is set such that a high sound side and a low sound side thereof with respect to the first pitch become even. Thus, at the second sound output step, the pitch of the sound to be outputted can be selected from the high sound side and the low sound side with respect to the first pitch in a well-balanced manner.

According to the ninth aspect, in the case where a second or later input is performed after the output timing of the target sound comes, the pitch of the sound to be outputted is selected from the nomination range including the pitch of the next target sound. Thus, the pitch of the sound to be outputted can be selected so as not to be too high or too low with respect to the next target sound. Therefore, even in the case where the pitch of the sound to be outputted is determined at random, the target sound can be outputted so as to provide a playing result which is natural following the melody of the musical score indicated by the music data.

According to the tenth aspect, the nomination range with the second pitch as the center thereof is set, so that the nomination range is set such that a high sound side and a low sound side thereof with respect to the second pitch become even. Thus, at the second sound output step, the pitch of the sound to be outputted can be selected from the high sound side and the low sound side with respect to the second pitch in a well-balanced manner.

According to the eleventh aspect, the nomination range is changed such that the width thereof is gradually decreased. Thus, as time proceeds, it becomes hard to select a pitch which is too high or too low with respect to the target sound and/or the next target sound. Therefore, the connection of the sound outputted during the target period with the next target sound is smooth, and the target sound can be outputted so as to provide a playing result which is natural following the melody of the musical score.

According to the twelfth aspect, the width of the nomination range is kept constant for the predetermined time period from the time when the output timing of the target sound comes. Thus, a sound is selected from the wide range at the beginning of the target period.

According to the thirteenth aspect, the width of the nomination range can be decreased easily.

According to the fourteenth aspect, concerning a sound of a specific tone color, a sound of an unnatural pitch is prevented from being outputted. Thus, the target sound can be outputted so as to provide a playing result which is natural.

According to the fifteenth aspect, the pitch of the target sound is selected from the chord sound. Thus, the target sound can be outputted so as to provide a playing result which is natural following the melody of the musical score.

According to the sixteenth aspect, the pitch of the target sound is selected from the scale sound. Thus, the target sound can be outputted so as to provide a playing result which is natural following the melody of the musical score.

According to the seventeenth aspect, in the case where sounds are consecutively outputted for a short time period, the pitch of the target sound to be outputted next time is determined based on a sound which is outputted last time (a sound which is last outputted). Thus, the target sound can be outputted so as to provide a playing result which is natural.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 shows an example of music data 63;
FIG. 12 shows an example of chord data 64;
FIG. 13 shows an example of scale data 65.

DESCRIPTION OF THE PREFERRED EMBODIMENTS (Whole Configuration of Game System)

Figure 1:
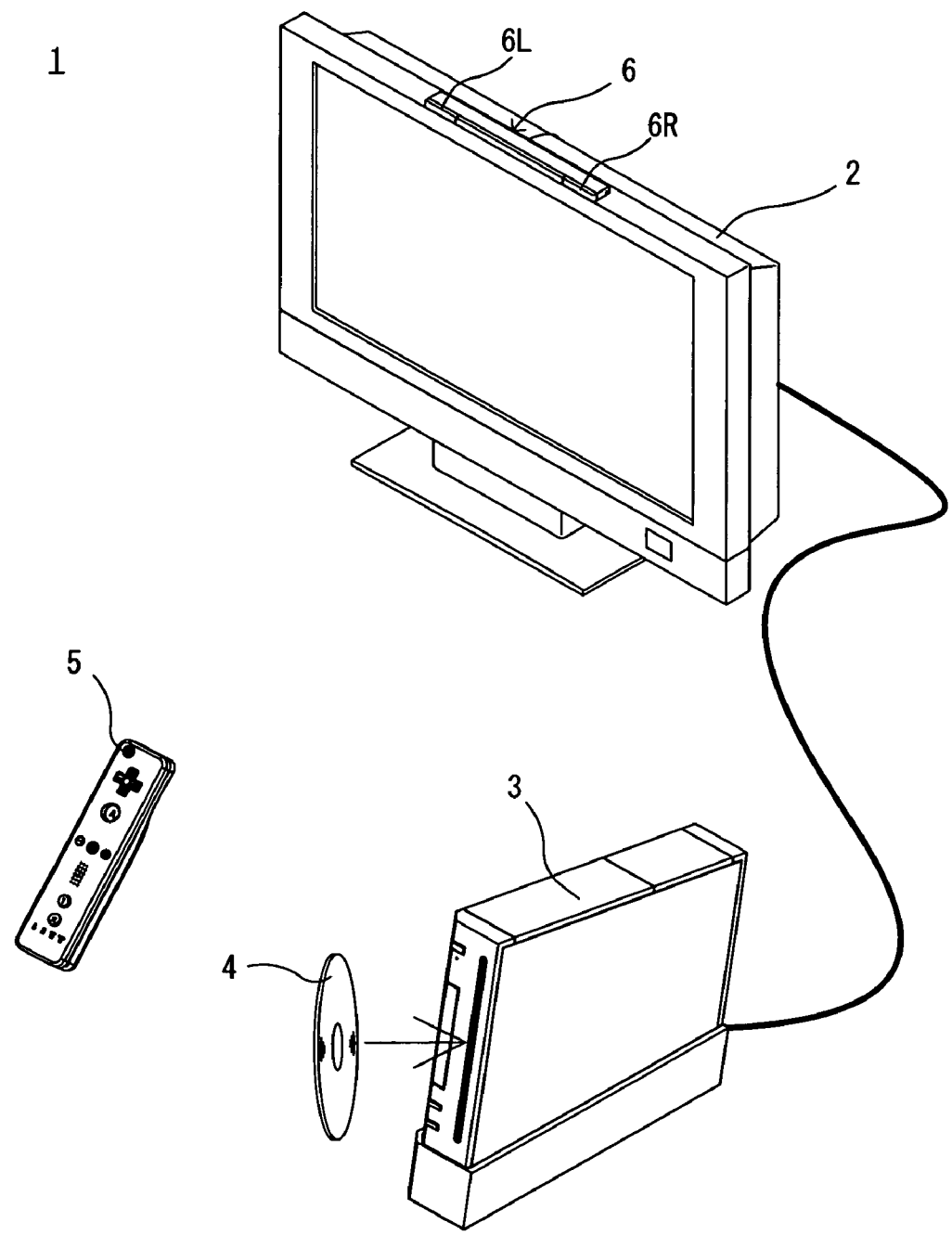
FIG. 1 is an external view illustrating a game system 1.

With reference to FIG. 1, the following will describe a game system 1 including a game apparatus according to an embodiment of the present invention. FIG. 1 is an external view illustrating the game system 1. Hereinafter, the game system 1 using a stationary game apparatus will be used as an example, and the game apparatus and a game program according to the present embodiment will be described. As shown in FIG. 1, the game system 1 comprises a television receiver (hereinafter, referred to merely as a television) 2, a game apparatus 3, an optical disc 4, a controller 5, and a marker section 6. The game system 1 executes game processing for a music playing game, in which a piece of music is played, at the game apparatus 3 in accordance with a game operation using the controller 5.

The optical disc 4 as an example of an exchangeable information storage medium replaceably used with respect to the game apparatus 3 is detachably inserted in the game apparatus 3. The optical disc 4 stores a game program which is to be executed by the game apparatus 3. The game apparatus 3 has at its front surface an insertion slot. The game apparatus 3 reads and executes the game program stored in the optical disc 4 which is inserted in the insertion slot for executing the game processing. It is noted that the game program may be stored in advance in an internal memory (it is preferably of a nonvolatile type but may be of a volatile type) of the game apparatus 3, or the game apparatus 3 downloads the game program from a predetermined server (or another game apparatus) connected to the game apparatus 3 through a network to store the game program in its internal memory.

The television 2 as an example of a display device is connected to the game apparatus 3 through a connection cord. The television 2 displays a game image which is obtained as the result of the game processing executed by the game apparatus 3. The marker section 6 is mounted adjacent to the screen of the television 2 (on the upper surface of the screen in FIG. 1). The marker section 6 has at its opposite ends a marker 6R and a marker 6L, respectively. The marker 6R has one or more infrared LEDs which output infrared lights forward from the television 2. The marker 6L has the same configuration as the marker 6R. The marker section 6 is connected to the game apparatus 3, and the game apparatus 3 is capable of controlling illumination of each infrared LED of the marker section The controller 5 is an input device which provides the game apparatus 3 with operation data which indicates contents of an operation made to the controller 5. The controller 5 is connected to the game apparatus 3 by radio communication. In the present embodiment, the technology of, for example, Bluetooth (registered trademark), is used for the radio communication between the controller 5 and the game apparatus 3. It is noted that in an alternative embodiment, the controller 5 and the game apparatus 3 may be configured so as to be at least communicable with each other, or the controller 5 may be connected to the game apparatus 3 through a wire.

(Internal Configuration of Game Apparatus 3)

Figure 2:
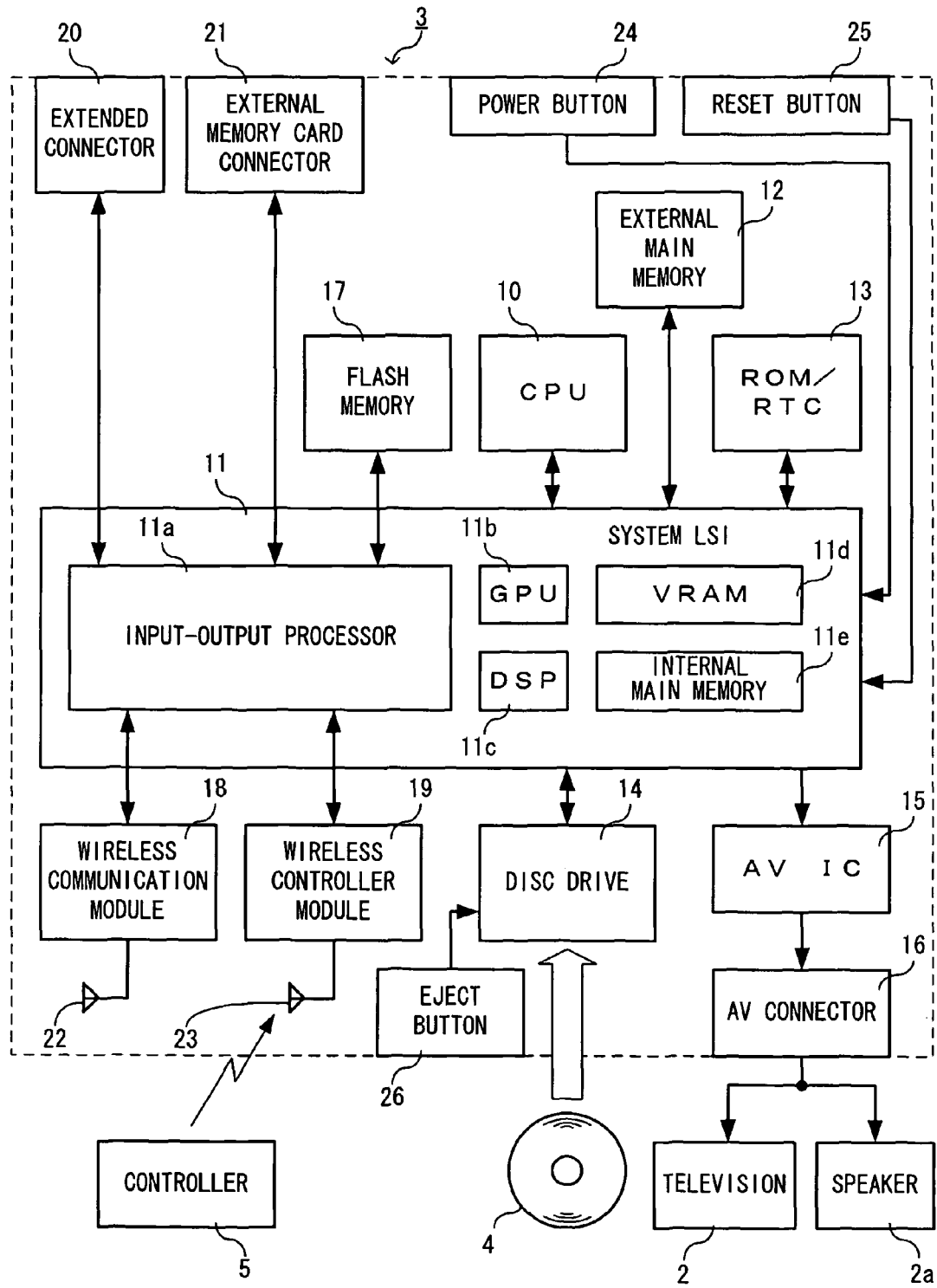
FIG. 2 is a functional block diagram of a game apparatus 3.

The following will describe an internal configuration of the game apparatus 3 with reference to FIG. 2. FIG. 2 is a block diagram of the game apparatus 3. The game apparatus 3 includes a CPU 10, a system LSI 11, an external main memory 12, a ROM/RTC 13, a disc drive 14, an AV-IC 15, and the like.

The CPU 10 executes the game processing by executing the game program stored in the optical disc 4, and functions as a game processor. The CPU 10 is connected to the system LSI 11. In addition, the external main memory 12, the ROM/RTC 13, the disc drive 14, and the AV-IC 15 are connected to the system LSI 11. The system LSI 11 performs processing such as control of data transmission between the system LSI 11 and each component connected to the system LSI 11, generation of an image to be displayed, obtaining data from an external device, and the like. The internal configuration of the system LSI will be described later. The volatile external main memory 12 stores a program such as the game program read from the optical disc 4, a game program read from a flash memory 17, and the like, and various data, and is used as a work region and a buffer region for the CPU 10. The ROM/RTC 13 includes a ROM (so-called boot ROM) which stores a program for starting up the game apparatus 3, and a clock circuit (RTC: Real Time Clock) for counting time. The disc drive 14 reads program data and texture data from the optical disc 4, and writes these data into an internal main memory 11e, which will be described later, or the external main memory 12.

The system LSI 11 is provided with an input-output processor 11a, a GPU (Graphics Processor Unit) 11b, a DSP (Digital Signal Processor) 11c, a VRAM 11d, and the internal main memory 11e. Although not shown in the drawings, these components 11a to 11e are connected to each other through an internal bus.

The GPU 11b forms a part of drawing means, and generates an image according to a graphics command (command for generating graphics) from the CPU 10. The VRAM 11d stores data, such as polygon data, texture data, and the like, which are required for the GPU 11b to execute the graphics command. In generating an image, the GPU 11d creates the image data using the data stored in the VRAM 11d.

The DSP 11c functions as an audio processor, and generates audio data using sound data and sound waveform (tone color) data which are stored in the internal main memory 11e and the external main memory 12.

The image data and the sound data generated thus are read by the AV-IC 15. The AV-IC 15 outputs the image data to the monitor 2 through the AV connector 16, and the sound data to a speaker 2a built in the monitor 2. Thus, an image is displayed on the monitor 2, and sound is outputted from the speaker 2a.

The input-output processor (I/O process) 11a performs transmission and reception of data to and from each component connected to the input-output processor 11a, and downloads data from an external device. The input-output processor 11a is connected to the flash memory 17, a wireless communication module 18, a wireless controller module 19, an extended connector 20, and a memory card connector 21. An antenna 22 is connected to the wireless communication module 18, and an antenna 23 to the wireless controller module 19.

The input-output processor 11a is connected to a network through the wireless communication module 18 and the antenna 22, so that the input-output processor 11a is communicable with another game apparatus connected to the network and various servers. The input-output processor 11a periodically accesses the flash memory 17 to detect whether there are data required to be transmitted to the network. If there are such data, the input-output processor 11a transmits the data to the network through the wireless communication module 18 and the antenna 22. The input-output processor 11a receives data transmitted from the other game apparatus and data downloaded from a download server through the network, the antenna 22 and the wireless communication module 18, and stores the received data in the flash memory 17. The CPU 10 reads the data stored in the flash memory 17 by executing the game program, and uses the data in the game program. In addition to the data transmitted or received between the game apparatus 3 and the other game apparatus and various servers, the flash memory 17 may store saved data (result data or midstream data of the game) of the game played using the game apparatus 3.

The input-output processor 11a receives operation data transmitted from the controller 5 through the antenna 23 and the wireless controller module 19, and stores (temporarily stores) the operation data in the buffer region of the internal main memory 11e or the external main memory 12.

In addition, the extended connector 20 and the memory card connector 21 are connected to the input-output processor 11a. The extended connector 20 is a connector for an interface such as USB and SCSI, and the communication with the network is enabled by connecting a medium such as an external storage medium, a peripheral device such as another controller, or a wired connector for communication to the extended connector 20 instead of the wireless communication module 18. The memory card connector 21 is a connector for connecting thereto an external storage medium such as a memory card. For example, the input-output processor 11a accesses the external storage medium through the extended connector 20 and the memory card connector 21 for storing data in the external storage medium and reading data from the external storage medium.

The game apparatus 3 is provided with a power button 24, a reset button 25, and an eject button 26. The power button 24 and the reset button 25 are connected to the system LSI 11. When the power button 24 is turned on, electric power is supplied to each component of the game apparatus 3 through an AC adaptor (not shown). The reset button 25 is pressed to make the system LSI 11 restart a boot program of the game apparatus 3. The eject button 26 is connected to the disc drive 14. The eject button 26 is pressed to eject the optical disc 4 from the disc drive 14.

(Configuration of Controller 5)

Figure 3:
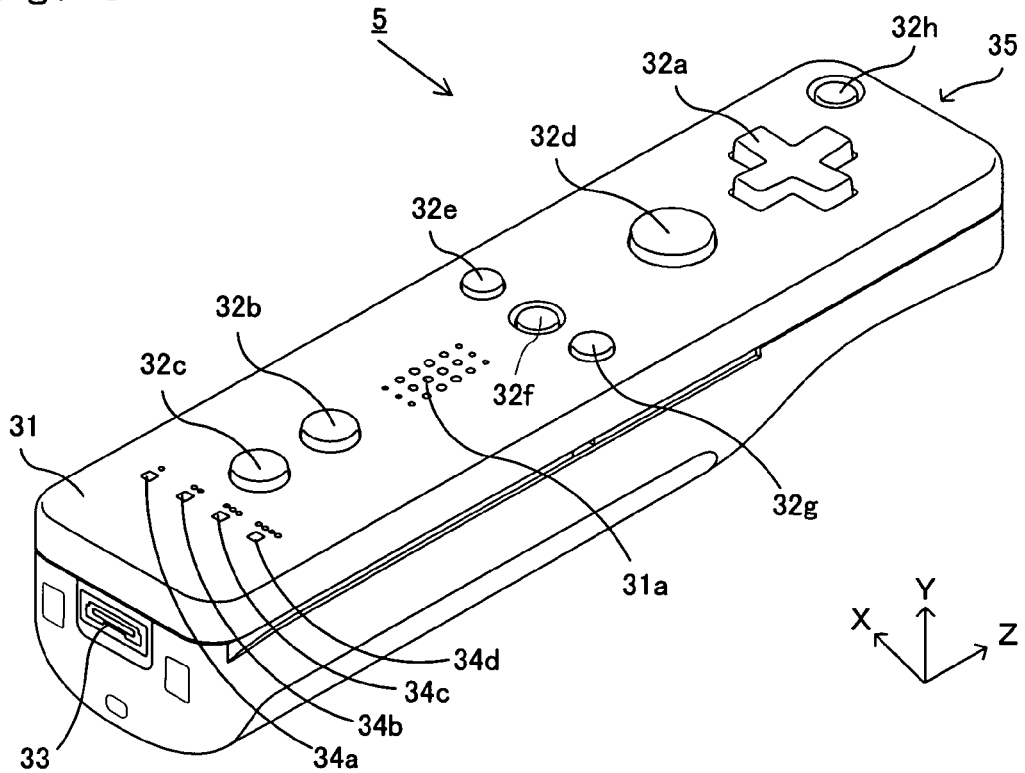
FIG. 3 is a perspective view of the controller 5 showing its external configuration.
Figure 4:
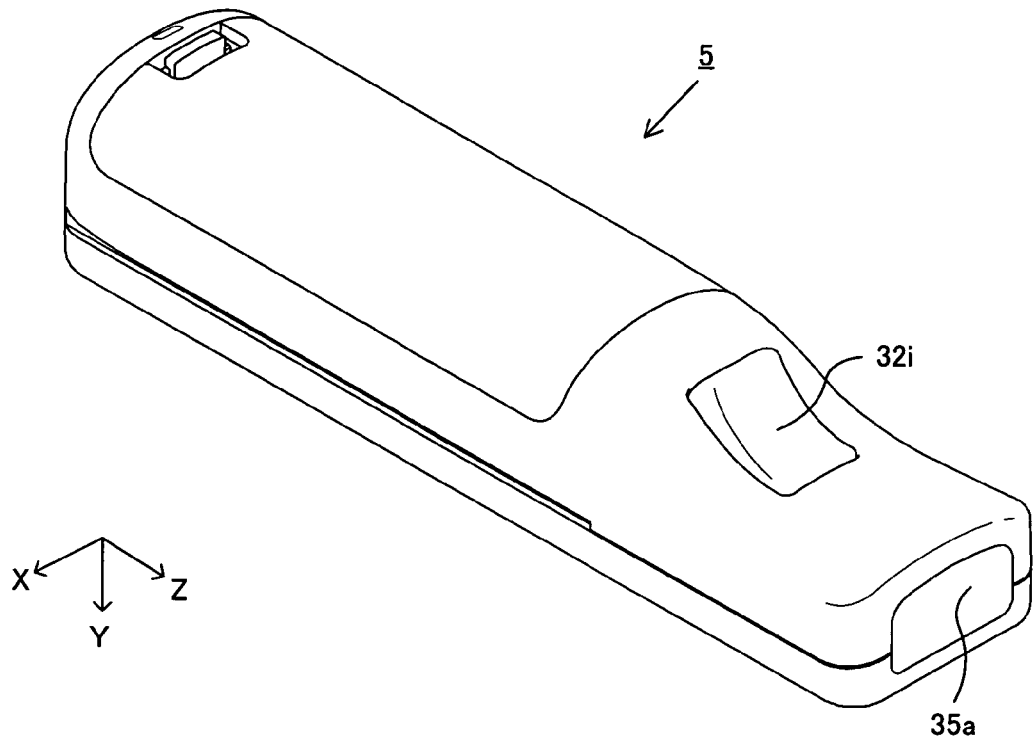
FIG. 4 is another perspective view of the controller 5 showing its external configuration.

The following will describe the controller 5 with reference to FIGS. 3 to 7. FIGS. 3 and 4 are perspective views of the controller 5 showing its external configuration. FIG. 3 is a perspective view of the controller 5 seen from a top rear side thereof, and FIG. 4 is a perspective view of the controller 5 seen from a bottom front side thereof.

As shown in FIGS. 3 and 4, the controller 5 includes the housing 31 which is formed by plastic molding. The housing 31 has a generally parallelepiped shape extending in a longitudinal direction from front to rear (a Z-axis direction shown in FIG. 3). The overall size of the housing 31 is small enough to be held by one hand of an adult or even a child. The player can perform the game operation by pressing a button provided to the controller or by moving the controller 5 to change its position and attitude.

The housing 31 is provided with a plurality of operation buttons. As shown in FIG. 3, a cross button 32a, a number one button 32b, a number two button 32c, an A button 32d, a minus button 32e, a home button 32f, a plus button 32g, and a power button 32h are provided on a top surface of the housing 31. On the other hand, as shown in FIG. 4, a recessed portion is formed on a bottom surface of the housing 31. On a slope surface of the recessed portion and at the rear side thereof, a B button 32i is provided. Functions according to the game program executed by the game apparatus 3 are appropriately assigned to these operation buttons 32a to 32i. The power button 32h is a power switch for turning on and off the power to the game apparatus 3 by remote control. The home button 32f and the power button 32h have top surfaces thereof buried in the top surface of the housing 31. This prevents the player from inadvertently pressing the home button 32f or the power button 32h.

On a rear surface of the housing 31, a connector 33 is provided. The connector 33 is used for connecting another device (e.g. another controller) to the controller 5.

On the top surface of the housing 31 on its front side, a plurality of LEDs 34a to 34d (four in FIG. 3) are provided. Here, a controller type (a number) is assigned to the controller 5 such that the controller 5 is distinguishable from the other controllers. The LEDs 34a to 34d are each used for informing the player of the controller type which is currently set for the controller 5, informing the player of a remaining battery power of the controller 5, and the like. More specifically, one of the plurality of LEDs 34a to 34d according to the above controller type is lit up in performing a game operation using the controller 5.

The controller 5 has an imaging information calculation section 35 (FIG. 6), and, a light incident surface 35a of the imaging information calculation section 35 is provided on a front surface of the housing 31 as shown in FIG. 4. The light incident surface 35a is formed by a material which transmits at least the infrared lights from the markers 6r and 6L.

Between the number one button 32b and the home button 32f on the top surface of the housing 31, a plurality of holes is provided for emitting sound from a speaker 49 (FIG. 5) built in the controller 5 to the outside therethrough.

Figure 5:
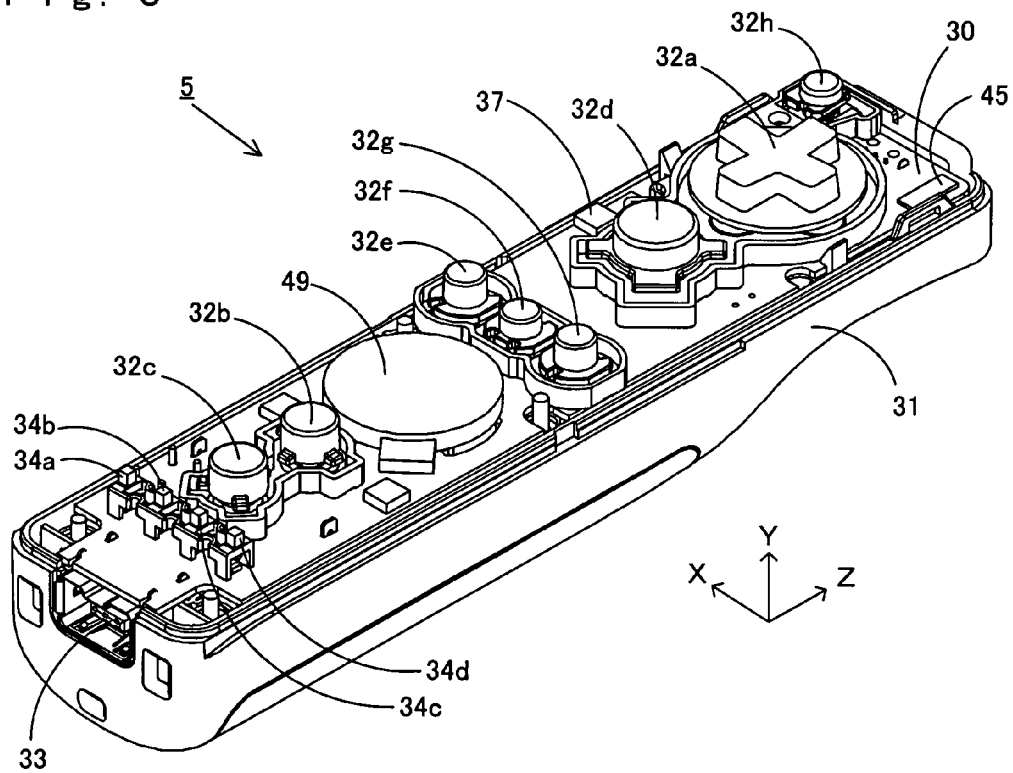
FIG. 5 is a perspective view of the controller 5 showing its internal configuration.
Figure 6:
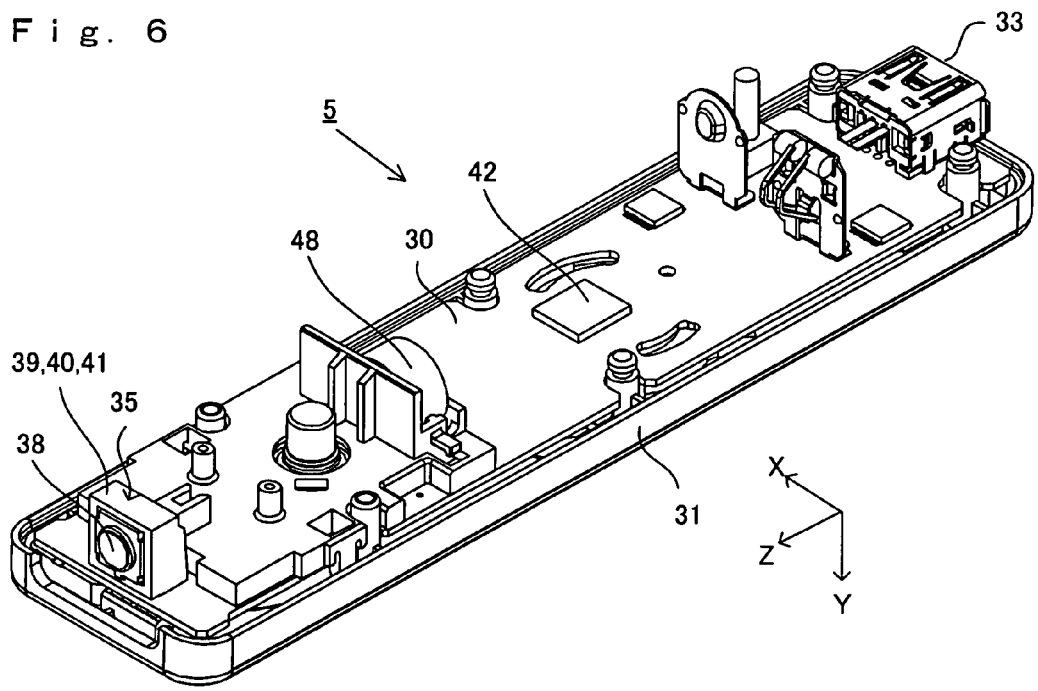
FIG. 6 is another perspective view of the controller 5 showing its internal configuration.

The following will describe an internal configuration of the controller 5 with reference to FIGS. 5 and 6. FIGS. 5 and 6 are perspective views of the controller 5 showing its internal configuration. FIG. 5 is a perspective view illustrating a state where an upper housing (a part of the housing 31) of the controller 5 is removed. FIG. 6 is a perspective view illustrating a state where a lower housing (a part of the housing 31) of the controller 5 is removed. FIG. 6 shows a reverse side of a substrate 30 shown in FIG. 5.

As shown in FIG. 5, the substrate 30 is fixed inside the housing 31. On a top main surface of the substrate 30, the operation buttons 32a to 32h, the LEDs 34a to 34d, an acceleration sensor 37, an antenna 45, the speaker 49, and the like. These components are connected to a microcomputer 42 (see FIG. 6) by lines (not shown) formed on the substrate 30 and the like. In the present embodiment, the acceleration sensor 37 is located at a position offset from the center of the controller 5 in X-axis direction. This facilitates calculating a movement of the controller 5 in rotating the controller 5 about Z-axis. In addition, the acceleration sensor 37 is located in the front portion of the controller 5 in the longitudinal direction (the Z-axis direction). The controller 5 function as a wireless controller by a wireless module 44 (FIG. 7) and the antenna 45.

As shown in FIG. 6, at a front edge of a bottom main surface of the substrate 30, the imaging information calculation section 35 is provided. The imaging information calculation section 35 includes an infrared filter 38, a lens 39, an image pickup element 40, and an image processing circuit 41. These components 38 to 41 are located in this order from the front surface of the controller 5, and mounted on the bottom main surface of the substrate 30.

Further, on the bottom main surface of the substrate 30, the microcomputer 42 and a vibrator 48 are provided. The vibrator 48 is, for example, a vibration motor or a solenoid, and connected to the microcomputer 42 by a line formed on the substrate 30 and the like. The vibrator 48 is actuated according to command from the microcomputer 42 to vibrate the controller 5. Thus, the vibration is conveyed to the player holding the controller 5, and a so-called vibration-feedback game is realized. In the present embodiment, the vibrator 48 is located in the front portion of the housing 31. In other words, the vibrator 48 is located closer to an end side of the controller 5 than the center of the controller 5. Thus, the controller 5 is substantially vibrated by the vibration of the vibrator 48. The connector 33 is mounted to the rear edge of the bottom main surface of the substrate 30. It is noted that in addition to the components shown in FIGS. 5 and 6, the controller 5 includes a crystal oscillator for generating a basic clock of the microcomputer 42, an amplifier for outputting a sound signal to the speaker 49, and the like.

It is noted that the shape of the controller 5, the shape of each operation button, and the numbers and the installation positions of the acceleration sensor and the vibrator as shown in FIGS. 3 to 6 are merely an example, and the present invention can be achieved with other shapes, other numbers, and other installation positions. Although an imaging direction by imaging means is a positive direction of Z-axis in the present embodiment, the imaging direction may be any direction. In other words, the imaging information calculation section 35 (the light incident surface 35a of the imaging information calculation section 35) does not have to be located in the front surface of the housing 31 of the controller 5, and may be provided in another surface as long as light can be taken from outside the housing 31.

Figure 7:
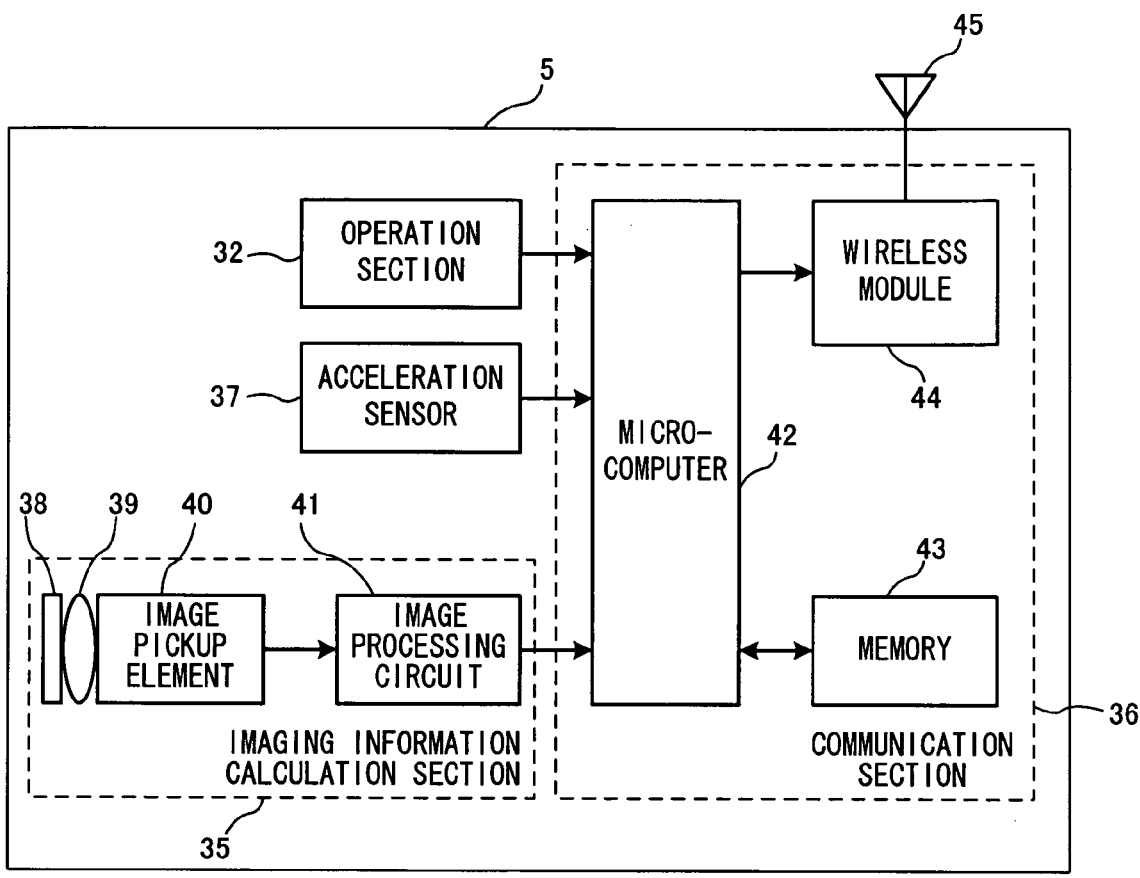
FIG. 7 is a block diagram showing a configuration of the controller 5.

FIG. 7 is a block diagram showing a configuration of the controller 5. The controller 5 includes an operation section 32 (the operation buttons 32a to 32i), the connector 33, the imaging information calculation section 35, a communication section 36, and the acceleration sensor 37. The controller 5 transmits to the game apparatus 3 data which indicates contents of an operation performed with respect to the controller 5 as operation data.

The operation section 32 includes the operation buttons 32a to 32i, and outputs to the microcomputer 42 of the communication section 36 operation button data which indicates an input state with respect to each of the operation buttons 32a to 32i (whether or not the operation buttons 32a to 32i are pressed).

The imaging information calculation section 35 is a system for analyzing image data of an image taken by the imaging means, thereby identifying an area having a high brightness in the image and detecting a position of a center of gravity, a size and the like of the area. The imaging information calculation section 35 has, for example, a maximum sampling period of about 200 frames/sec, and therefore can trace and analyze even a relatively fast motion of the controller 5.

The imaging information calculation section 35 includes the infrared filter 38, the lens 39, the image pickup element 40, and the image processing circuit 41. The infrared filter 38 allows, among incident lights on the front of the controller 5, only an infrared light to pass therethrough. The lens 39 converges the infrared light which has passed through the infrared filter 38, and causes the infrared light to be incident on the image pickup element 40. The image pickup element 40 is a solid-state image pickup element such as a CMOS sensor or a CCD. The image pickup element 40 receives the infrared light collected by the lens 39, and outputs an image signal. Here, the markers 6R and 6L of the marker section 6 which are located adjacent to the screen of television 2 have the infrared LEDs which output infrared lights forward from the television 2. The provision of the infrared filter 38 allows the image pickup element 40 to receive only the infrared light which has passed through the infrared filter 38 to generate image data, thereby more accurately taking an image of the markers 6R and 6L. Hereinafter, an image taken by the image pickup element 40 is referred to as a taken image. The image data generated by the image pickup element 40 is processed by the image processing circuit 41. The image processing circuit 41 calculates the position of an object (the markers 6R and 6L) to be imaged in a taken image. Hereinafter, a coordinate indicating the calculated marker position is referred to as a "marker coordinate". The image processing circuit 41 outputs data (marker coordinate data) of a maker coordinate to the microcomputer 42 of the communication section 36. The marker coordinate data is transmitted as operation data by the microcomputer 42 to the game apparatus 3. The marker coordinate changes corresponding to the facing direction (attitude) and the position of the controller 5. Thus, the game apparatus 3 can calculate the facing direction and the position of the controller 5 using the marker coordinate.

The acceleration sensor 37 detects acceleration (including acceleration of gravity) of the controller 5, namely, a force (including a gravity force) applied to the controller 5. The acceleration sensor 37 detects a value of linear acceleration in a sensing axis direction among acceleration applied to the detection portion of the acceleration sensor 37. In the present embodiment, the acceleration sensor 37 detects linear acceleration of the controller 7 for three axial directions of the controller 5, i.e., an up-down direction (Y-axis direction shown in FIG. 3), a left-right direction (the X-axis direction shown in FIG. 3), and a front-rear direction (the Z-axis direction shown in FIG. 3) of the controller 5. The detected acceleration is represented as a three-dimensional vector in an XYZ coordinate system which is set with the controller 5 as a standard. Data (acceleration data) which indicates the acceleration detected by the acceleration sensor 37 is outputted to the communication section 36. It is noted that since the acceleration detected by the acceleration sensor 37 changes corresponding to the facing direction (attitude) and movement of the controller 5, the game apparatus 3 can calculate the facing direction and the movement of the controller 5 using the acceleration data.

The communication section 36 includes the microcomputer 42, a memory 43, the wireless module 44, and the antenna 45. The microcomputer 42 controls the wireless module 44 for wirelessly transmitting the transmission data received by the microcomputer 42 while using the memory 43 as a storage area during processing.

Data (the operation button data, the marker coordinate data, and the acceleration data) outputted to the microcomputer 42 from the operation section 32, imaging information calculation section 35, and the acceleration sensor 37 are stored temporarily in the memory 43. These data are transmitted as the operation data to the game apparatus 3. More specifically, at a timing for the game apparatus 3 to perform transmission to the wireless controller module 19, the microcomputer 42 outputs to the wireless module 44 the transmission data stored in the memory 43. The wireless module 44 uses, for example, the Bluetooth (registered trademark) technology to modulate a carrier wave of a predetermined frequency with the operation data and to radiate the resultant weak radio signal. In other words, the operation data is converted into the weak radio signal by the wireless module 44, and transmitted from the controller 5. The weak radio signal is received by the wireless controller module 19 of the game apparatus 3. The game apparatus 3 can obtain the operation data by demodulating and decoding the received weak radio signal. Then, the CPU 10 of the game apparatus 3 executes the game processing based on the obtained operation data and the game program. Radio transmission from the communication section 36 to the wireless controller module 19 is performed at a predetermined time interval. Since the game processing is generally performed at a cycle of 1/60 sec, it is preferable that the radio transmission is performed at a cycle of a time period shorter than 1/60 sec. The communication section 36 of the controller 5 transmits each operation data to the wireless controller module 19 of the game apparatus 3, for example, every 1/200 sec.

By using the controller 5, the player can perform an operation of pointing to a position on a screen, and an operation of moving the controller 5, in addition to general game operation such as pressing each operation button. For example, in a later-described music playing game, the player moves the controller 5 from up to down thereby to perform an input (a sound production input) to the game apparatus 3 for outputting a sound.

(Outline of Game Performed with Game Apparatus)

Figure 8:
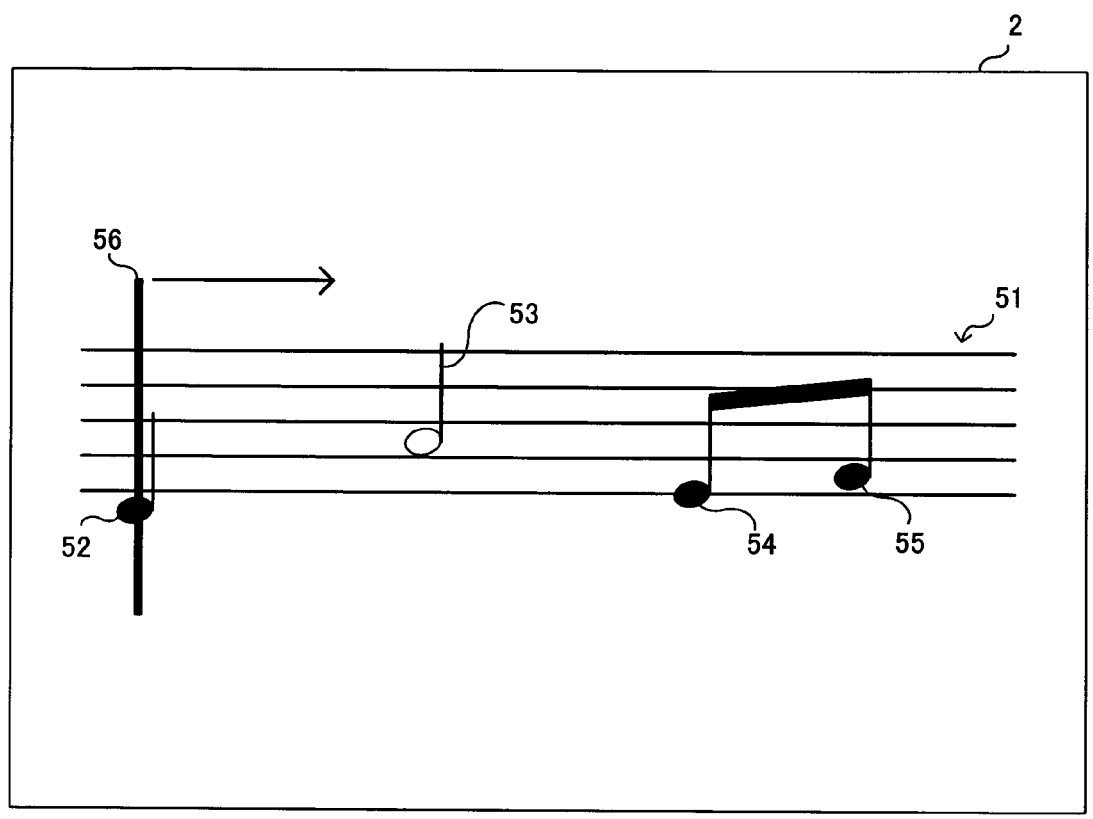
FIG. 8 illustrates an example of a game screen displayed in a game according to an embodiment.

The following will describe the outline of the game performed with the game apparatus 3. The game is a music playing game in which the game apparatus 3 outputs a sound according to an input to the controller 5 performed by the player, thereby making the player play a piece of music. FIG. 8 FIG. 8 illustrates an example of a game screen displayed in the game according to the present embodiment. As shown in FIG. 8, a musical score 51 indicating a melody of a piece of music to be played is displayed on the screen of the television 2. In FIG. 8, notes 52 to 55 are shown on the musical score 51. In the present embodiment, a part (a bar in FIG. 8) of the musical score of the piece of music is shown on the screen. More specifically, only a part of the musical score to be played at the current time is shown on the screen. As the playing proceeds, the game apparatus 3 sequentially updates the contents of the musical score to be displayed. It is noted that although only a bar of the musical score is displayed on the screen in the present embodiment, in an alternative embodiment, two bars or more of the musical score may be simultaneously displayed on the screen, or the entire musical score of the piece of music may be simultaneously displayed on the screen. Also, in the present embodiment, the piece of music is constituted of a part (hereinafter, referred to as a target part) which is played by the player, and a part or more which is automatically played by the game apparatus 3. In the present embodiment, a musical score indicating a melody of the target part played by the player is displayed on the screen, and a musical score of the other parts other than the target part is not displayed on the screen. It is noted that in an alternative embodiment, the game apparatus 3 may display the musical score of the other parts as well as the musical score of the target part on the screen.

On the screen, a timing bar 56 is displayed together with the musical score 51. The timing bar 56 moves on the musical score 51 in a direction in which the playing proceeds (rightward in FIG. 8) as the playing proceeds (as time proceeds) (see the arrow in FIG. 8). When the timing bar 56 moves to the end of the displayed musical score (the right edge of the musical score 51 in FIG. 8), the next contents of the musical score are newly displayed on the screen. Then, the timing bar 56 moves from the beginning (the left edge) of the newly displayed musical score to the end (the right edge) thereof. During the playing, updating display of the musical score and movement of the timing bar 56 are repeated. The timing bar 56 is an image for informing the player of a timing to perform an input. The player performs an input at a timing when the timing bar 56 is located on the position of a note on the musical score 51, thereby outputting a sound of each note at a timing according to the musical score.

In the present embodiment, when the player performs an input, the game apparatus 3 outputs a sound according to the input regardless of the position of the timing bar 56. In other words, in the present embodiment, the timing bar 56 is merely a rough guide for outputting a sound of each note at a timing according to the musical score 51, and a sound is outputted according to the input performed by the player even when the position of the timing bar 56 is out of the position of the note.

Figure 9:
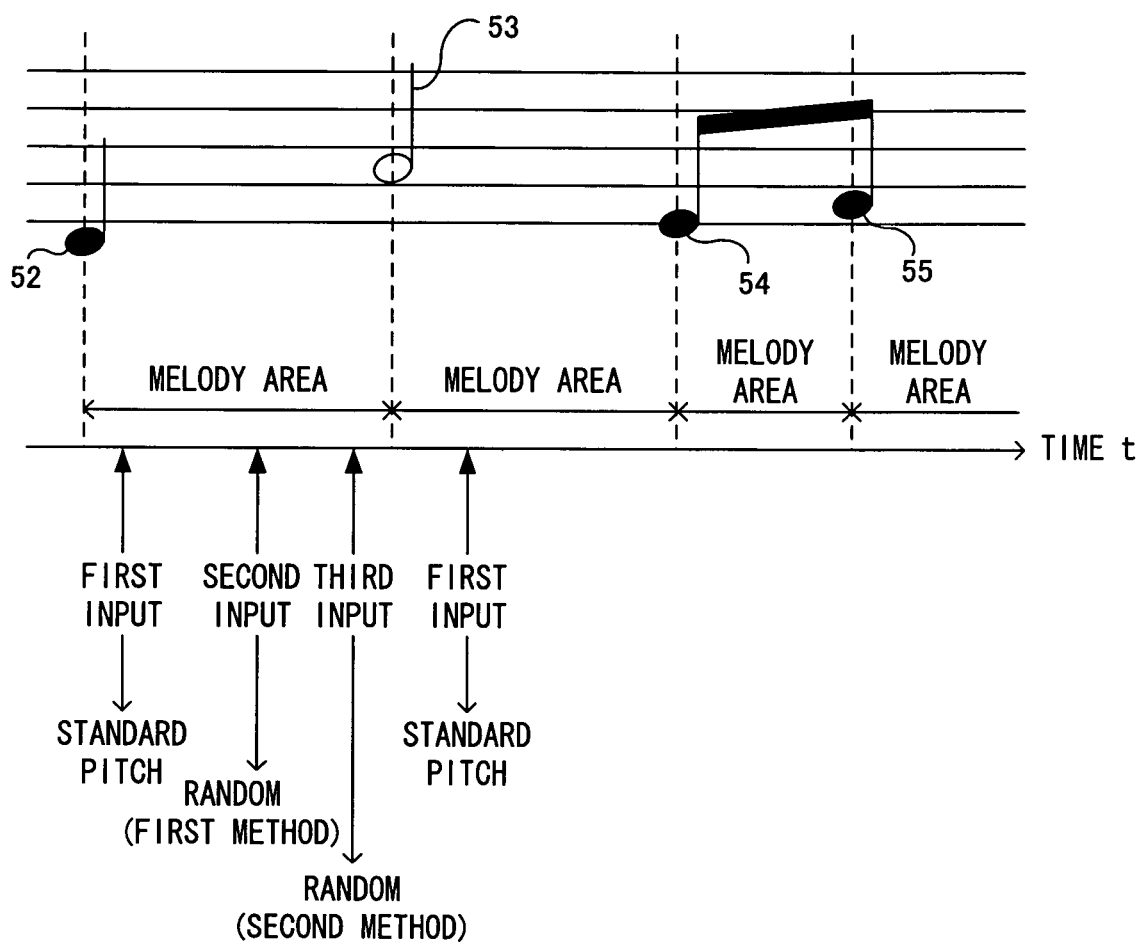
FIG. 9 illustrates an example of melody areas each associated with a note.

The game apparatus 3 uses a concept of a melody area for determining a sound to be outputted according to an input by the player. "Determining a sound" means to determine a tone color, a pitch, a quantity (a length of time for which a sound is outputted), and the like of a sound. The melody area is a time region which is associated with each of sounds which form a melody to be played by the player. FIG. 9 illustrates an example of melody areas each associated with a note. As shown in FIG. 9, in the present embodiment, the melody area associated with a sound is set to a time region from the position of the sound on the musical score (a time to output the sound) to the position of a sound after the sound. In FIG. 9, for example, a melody area associated with the sound of a note 52 is a time region from the position of the note 52 to the position of the next note 53. It is noted that the melody area associated with the last sound in the musical score may be set to a time region from the position of the last sound on the musical score to the end position of the musical score (a time of end of the playing), or to a time region having a predetermined time length from the position of the last sound. It is noted that in the case where there is a rest on the musical score, a melody area may be set with the rest neglected, or a melody area may not be set to a time region from the position of the rest to the position of a note after the rest.

In the case where an input is performed by the player in a melody area (at a time within the melody area), a tone color and a quantity of a sound corresponding to the input (a sound outputted according to the input) are determined according to contents of music data stored in the game apparatus 3. The music data is data indicating information of a tone color, a pitch, a quantity, an output timing and the like of a sound of each note on the musical score (see FIG. 11). Therefore, the tone color and the quantity of the sound corresponding to the input performed in a melody area are determined to be a tone color and a quantity which are defined in advance in the music data concerning a sound associated with the melody area. As described above, in the present embodiment, in the case where a plurality of inputs are performed by the player in one melody area, sounds having the same tone color and quantity (although described later, pitches are different) are outputted a number of times which is the same as a number of inputs.

Meanwhile, in the case where an input is performed by the player in a melody area, the pitch of a sound corresponding to the input is determined as follows. The pitch of a sound corresponding to a first input performed in the melody area is determined according to the music data stored in the game apparatus 3. More specifically, the pitch of the sound corresponding to the first input performed in the melody area is determined to be the pitch of a sound associated with the melody area, which is defined in advance in the music data (see FIG. 9). In other words, the sound corresponding to the first input performed in the melody area is outputted at the pitch according to the musical score. It is noted that hereinafter, a pitch which is defined in advance in the music data is referred to as a "standard pitch".

As shown in FIG. 9, the pitch of a sound corresponding to a second input or later performed in the melody area is determined at random (within a later-described nomination range). In other words, the sound corresponding to the second input or later performed in the melody area is not necessarily outputted at the standard pitch according to the musical score, may be outputted at a pitch different from that of the musical score. It is noted that although described later, in the present embodiment, a method of determining the pitch of the sound corresponding to the second input is different from that to the third or later input (see FIG. 9).

For describing more specifically with reference to FIG. 9, the case where three inputs are performed in a melody area associated with the note 52 indicating a pitch of "re" is considered. In this case, a sound corresponding to the first input is outputted at the standard pitch, or the pitch of "re". On the other hand, pitches of sounds corresponding to the second and third inputs are determined at random, and the sounds are not necessarily outputted at the pitch of "re" according to the musical score. It is noted that in the case where a melody area is changed and an input is newly performed during a time period of a melody area associated with the note 53 indicating a pitch of "la", since the input is the first input in the melody area, a sound is outputted at a standard pitch or the pitch of "la".

As described above, in the present embodiment, a melody area is set for each of the sounds which form the melody of the piece of music. A first output sound in a melody area (a sound outputted according to a first input performed during a time period of the melody area) is outputted at the standard pitch, second and later output sounds in the melody area are outputted at pitches which are determined at random. According to this, the player performs an input at an appropriate timing to the movement of the timing bar 56, thereby outputting a sound at the pitch according to the musical score as the first output sound. Thus, the player can precisely play the melody of the piece of music. As described above, in the present game, the player can play the game in such a playing manner as to "play the piece of music precisely (so as to follow the contents of the musical score) by performing inputs at appropriate timings" similarly to the conventional music playing game.

Further, in the present embodiment, the player can freely output the second and later output sounds in the melody area. This allows the player to arrange the melody of the musical score in addition to outputting the sounds according to the musical score. Hereinafter, the second and later output sounds are each referred to as an "ad-lib sound". Therefore, the present game can offer a playing manner which is not provided in the conventional music playing game, namely, "freely arranging the melody of the musical score (adding ad-lib sounds)", in addition to the conventional playing manner described above.

According to the present embodiment, the first output sound in a melody area is outputted at the standard pitch according to the musical score. Thus, when at least one input is performed in each melody area, at least the melody of the musical score is outputted. If the pitch of the first output sound in a melody area is determined at random, even when the player performs at least one input in the melody area, a melody different from that of the musical score is outputted as a playing result. In other words, even when the player correctly performs input operation, the melody of the musical score to be normally outputted is not outputted. Thus, the playing result is different from the melody which the player expects, and becomes an unnatural melody. On the other hand, according to the present embodiment, if the player performs at least one input in each melody area, a melody different from that of the musical score is not outputted. This prevents the melody of the playing result from becoming unnatural.

It is noted that in the present embodiment, the pitches of the second and later output sounds (the ad-lib sounds) in a melody area are determined at random but the game apparatus 3 executes various processing so that the pitch of the ad-lib sound is determined to be a natural pitch so as to follow the melody of the musical score. For example, the game apparatus 3 sets a nomination range based on the standard pitch of the sound associated with the current melody area and the standard pitch of the sound associated with the next melody area, and selects the pitch of a sound to be outputted from the nomination range. Also, for example, the game apparatus 3 selects the pitch of a sound to be outputted from sounds which belong to a chord and a scale of the piece of music. It is noted that detail processing for causing the pitch of the ad-lib sound to become natural will be described later.

(Detail of Game Processing)

Figure 10:
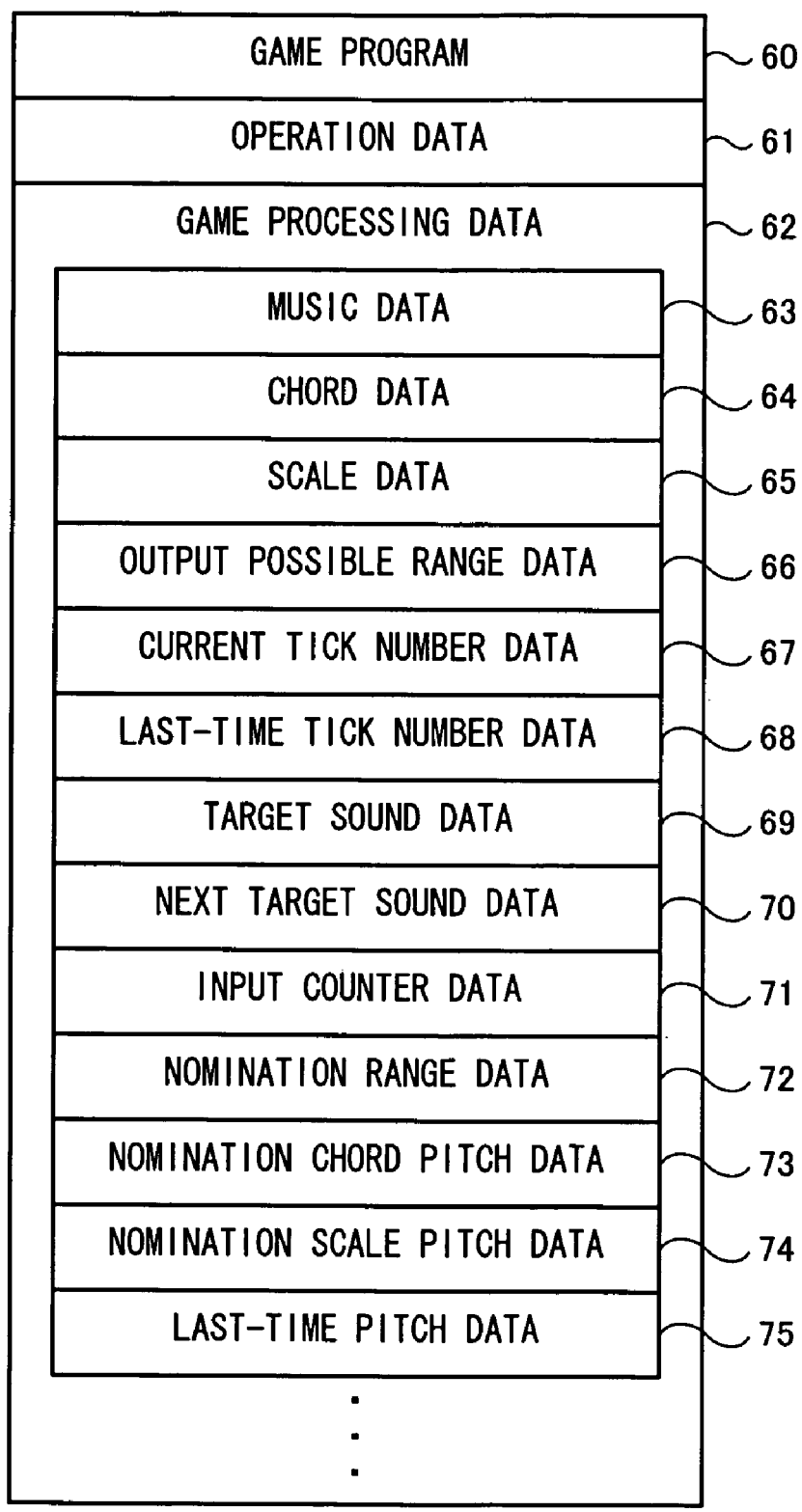
FIG. 10 shows an example of main data stored in a main memory of the game apparatus 3.

With reference to FIGS. 10 to 22, the following will describe in detail the game processing executed by the game apparatus according to the present embodiment. First, data used in the game processing in the present embodiment will be described. FIG. 10 shows an example of main data stored in a main memory (the external main memory 12 or the internal main memory 11e) of the game apparatus 3. As shown in FIG. 10, a game program 60, operation data 61, game processing data 62, and the like are stored in the main memory.

Figure 14:
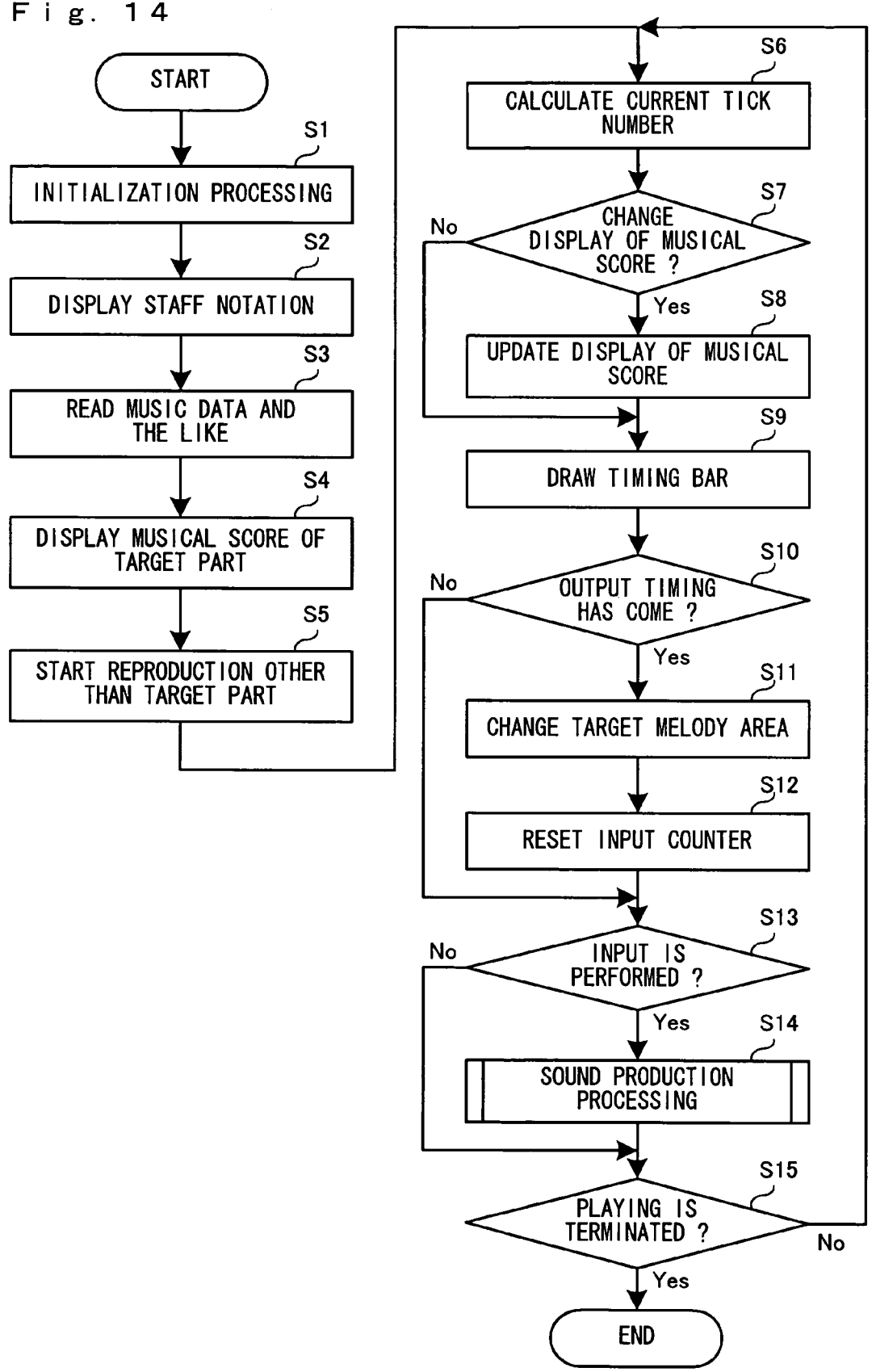
FIG. 14 is a main flow chart showing a procedure of game processing executed by the game apparatus 3.

The game program 60 is a program for causing the CPU 10 of the game apparatus 3 to execute the later-described game processing (FIG. 14). A part or all of the game program 60 is read from the optical disc 4 at an appropriate timing after power is applied to the game apparatus 3, and stored in the main memory.

The operation data 61 is operation data which is transmitted from the controller 5 to the game apparatus 3, and stored in the main memory. The operation data 61 includes the operation button data, the marker coordinate data, and the acceleration data. The operation button data is data indicating an input state with respect to each of the operation buttons 32a to 32i. The marker coordinate data is data indicating the marker coordinate which is calculated by the imaging information calculation section 35. The acceleration data is data indicating the acceleration vector which is detected by the acceleration sensor 37. Since the operation data is transmitted from the controller 5 to the game apparatus 3 every 1/200 sec as described above, the operation data stored in the main memory is updated at this rate. Only the latest (lastly obtained) operation data may be stored in the main memory.

The game processing data 62 is data used in the later-described game processing (FIG. 14). The game processing data 62 includes music data 63, chord data 64, scale data 65, output possible range data 66, current tick number data 67, last-time tick number data 68, target sound data 69, next target sound data 70, input counter data 71, nomination range data 72, nomination chord pitch data 73, nomination scale pitch data 74, and last-time pitch data 75. It is noted that in addition to the data shown in FIG. 10, the game processing data 62 includes data required for the game processing, such as sound source data of each of the parts which constitute the piece of music, image data of various objects (the notes, the timing bar, and the like) which are displayed as game images, and the like.

The music data 63 is data indicating the contents of the piece of music to be played. In the present embodiment, MIDI data is used as the music data 63. FIG. 11 shows an example of the music data 63. It is noted that FIG. 11 shows the contents of one of the parts included in the piece of music. Actually, the music data 63 includes data of each of the parts included in the piece of music. Although it is described that in FIG. 10 only music data of one piece of music is stored in the main memory, music data of each of a plurality of pieces of music may be stored in the main memory.

As shown in FIG. 11, the music data 63 in the present embodiment indicates information about an output timing, a tone color, a pitch and a quantity of each of the sounds which form the melody of the piece of music to be played.

The information of the output timing indicates a timing to output a sound. In the present embodiment, a unit of time for the piece of music is set as "one tick", a time in a time region from the beginning of the piece of music to the end thereof is represented by a tick number. In other words, a time during playing can be represented by a tick number. Thus, the information of the output timing can be represented by a tick number. The information of the output timing is represented by a tick number which is set to a standard (0 tick) at the time of start of playing. For example, the second line from the top of the table in FIG. 11 indicates that a sound is outputted at a time when 192 ticks elapse from the time of start of playing. It is noted that the tick number does not indicate an absolute time length, the absolute time length of one tick is changed depending on a tempo of the piece of music. The tempo of the piece of music may be determined in the music data, or may be appropriately set by the player. A tick number corresponding to the time length of a quarter note is referred to as a time base. In the present embodiment, the time base is set, for example, to "48". In other words, in the present embodiment, the time length of the quarter note is set to 48 ticks. The time base indicates a resolution power in a time region.

The information of the tone color is an identifier for identifying types of sound sources (tone colors) which are prepared in advance. For example, the second to fifth lines from the top of the table in FIG. 11 indicate that four sounds are outputted with a sound source the number of the identifier of which is "11". Regarding the information of the tone color, the previous information is taken over before changed. Thus, the information of the tone color may not be described except at the time of initial setting and at the time of change.

The information of the pitch represents the pitch of a sound. Here, the pitch is represented by the pitch of an octave and a pitch name, e.g., ""re" of octave "2"". The pitch of the octave is represented by a numeric value. The pitch name is any of "do" to "si" ("do", "do#", "re", "re#", "mi", "fa", "fa#", "so", "so#", "la", "la#", and "si").

The quantity represents a time length for which a sound is outputted by using a tick number. The quantity is represented by a tick number which is set to a standard (0 tick) at the time of start of outputting a sound. For example, the second line from the top of the table in FIG. 11 indicates that a sound is outputted for a time period of 48 ticks. It is noted that the length of the sound which is actually produced in the case where the game apparatus 3 outputs a sound according to the music data 63 is changed even depending on the tone color of the sound, the rhythm of the piece of music, and the like in addition to the information of the quantity. For example, with the tone color of an organ or a violin, a sound is outputted for a relatively long time period while a sound is outputted with the tone color of a guitar or a piano for a relatively short time period.

It is noted that the music data 63 may be of any type as long as the pitch of each of the sounds which form the melody of the piece of music and the timing to output the sound are specified. For example, in the present embodiment, the pitch is represented by two types of information, namely the octave and the pitch name. In an alternative embodiment, the pitch may be represented by one type of a numerical value. Further, in an alternative embodiment, the music data may include information indicating a loudness of a sound, in addition to the above information.

The chord data 64 is data indicating a chord to be used for each time region of the piece of music. FIG. 12 shows an example of the chord data 64. As shown in FIG. 12, the chord data 64 is data in which pitch names of a chord sound (a chord tone) in the area are associated with each area (time region) of the piece of music. For example, in FIG. 12, pitch names, "mi-so-si-re", are associated with an area A, and pitch names, "re-fa-la-do", are associated with an area B, and pitch names, "so-si-re-mi-fa", are associated with an area C. It is noted that similarly to the information of the output timing, the beginning and the end of each area are each represented by the tick number which is set to a standard at the time of start of playing. The area defined in the chord data 64 is independent from the melody area described above, and does not necessarily correspond to the melody area. In addition, in a piece of music in which there is no change in key, the number of areas defined in the chord data 64 may be one. In other words, one type of a chord tone may be associated with the entire time region of the piece of music. The contents of the chord data 64 are determined, for example, according to a chord used in the other parts other than the target part to be played by the player. Although described in detail later, the chord data 64 is used for determining the pitch of the ad-lib sound described above.

The scale data 65 is data indicating a scale to be used for each time region of the piece of music. FIG. 13 shows an example of the scale data 65. As shown in FIG. 13, the scale data 65 is data in which pitch names of a scale sound (a scale tone) used in the area are associated with each area (time region) of the piece of music. For example, as shown in FIG. 13, pitch names, "do-re-mi-fa-so-ra-si", are associated with an area A, and pitch names, "ra-si-do#-re-mi-fa#-so#-ra", are associated with an area B. It is noted that similarly to the area defined in the chord data 64, the beginning and the end of each area are each represented by the tick number which is set to a standard at the time of start of playing. The area defined in the scale data 65 is independent from the melody area described above and the area defined in the chord data 64, and does not necessarily correspond to these areas. In addition, in a piece of music in which there is no change in key, the number of areas defined in the scale data 65 may be one. In other words, one type of a scale tone may be associated with the entire time region of the piece of music. The contents of the scale data 65 are determined, for example, according to a scale used in the other parts other than the target part to be played by the player. Although described in detail later, the scale data 65 is used for determining the pitch of the ad-lib sound.

The output possible range data 66 is data indicating an output possible range for the tone color of each of the parts which constitute the piece of music. It is noted that sounds of a different tone color are outputted for each part. More specifically, the output possible range data 66 is data in which information of a pitch range is associated with information indicating each part. It is noted that the identifier for identifying types of the sound sources, which is used as the information of the tone color in the music data 63, may be used as the information indicating each part. As described above, the pitch may be represented by the octave and the pitch name, or by a numeric value. In the present embodiment, the output possible range data 66 is used for setting the later-described nomination range.

The music data 63, the chord data 64, the scale data 65, and the output possible range data 66 are stored in the optical disc 4 along with the game program 60. These data are read from the optical disc 4 at an appropriate timing in executing the game processing by the game apparatus 3, and stored in the main memory. It is noted that the chord data 64, the scale data 65, and the output possible range data 66 are stored independently of the music data 63 (the MIDI file) in the present embodiment, but may be stored in the MIDI file.

The current tick number data 67 indicates a tick number (referred to as a current tick number) indicating the current time in the entire time region of the piece of music. Similarly to the information of the output timing, the current tick number is represented by the tick number which is set to a standard at the time of start of playing. It is noted that the game apparatus 3 stores a program (a library) for calculating the current tick number, and can obtain the current tick number using this program.

The last-time tick number data 68 indicates a tick number (referred to as a last-time tick number) at the time of outputting a sound last time. In other words, in the case where a sound is outputted according to an input by the player, the game apparatus 3 stores the tick number at the time of the output as the last-time tick number data 68 in the main memory.

The target sound data 69 indicates a sound (referred to as a "target sound") associated with the current melody area. "The current melody area" is a melody area including the current tick number, and hereinafter referred to as a "target melody area". The target sound is a sound, at the current time, the coming of the output timing of which is last detected. In other words, the target sound is a sound, among sounds which form the target part, the tick number of the output timing of which is smaller than the current tick number and the closest to the current tick number. The information indicated by the target sound data 69 may be any information as long as the target sound is specified. For example, the information may be the number in the case where a number is assigned to each of the sounds which form the target part, or may be a value of the output timing.

The next target sound data 70 is data indicating a sound (referred to as a "next target sound") the output timing of which comes after the target sound. The next target sound is a sound, among the sounds which form the target part, the tick number of the output timing of which is larger than the current tick number and the closest to the current tick number. Similarly to the target sound data 69, the next target sound data 70 may be the number in the case where a number is assigned to each of the sounds which form the target part, or may be a value of the output timing.

It is noted that the target melody area is specified by the target sound and the output timing of the next target sound. In other words, the beginning of the target melody area is the output timing of the target sound, and the end thereof is the output timing of the next target sound.

The input counter data 71 indicates a value of an input counter representing a number of times which an input is performed in one melody area. The value of the input counter is incremented by one each time an input is performed by the player. When the melody area is changed (or each time the output timing of a sound forming the melody of the piece of music comes), the value of the input counter is reset to "zero".

The nomination range data 72 is data indicating the nomination range. The nomination range represents a range from which a pitch is selected in the case where the pitch of a sound to be outputted is selected at random. More specifically, the nomination range is represented by a lower limit and an upper limit of the pitch. Alternatively, the nomination range may be represented by listing all pitches which can be selected.

The nomination chord pitch data 73 is data indicating nomination chord pitches. The nomination chord pitches are pitches, among pitches included in the nomination range, the pitch name of each of which corresponds to a pitch name of a chord sound used at the current time. It is noted that "a chord sound used at the current time" is a chord sound associated with the area at the current time in the chord data 64.

The nomination scale pitch data 74 is data indicating nomination scale pitches. The nomination scale pitches are pitches, among the pitches included in the nomination range, the pitch name of each of which corresponds to a pitch name of a scale sound used at the current time and which satisfies later-described predetermined conditions. It is noted that "a scale sound used at the current time" is a scale sound associated with the area at the current time in the scale data 65.

The last-time pitch data 75 is data indicating the pitch (referred to as a "last-time pitch") of the sound outputted last time. The last-time pitch may be represented by the octave and the pitch name, or by a numeric value.

The following will describe in detail the game processing executed by the game apparatus 3 with reference to FIGS. 14 to 22. FIG. 14 is a main flow chart showing a procedure of the game processing executed by the game apparatus 3. When power is applied to the game apparatus 3 and the optical disc 4 storing the game program is inserted into the game apparatus 3, the CPU 10 of the game apparatus 3 executes the boot program stored in a boot ROM (not shown), thereby initializing each unit such as the main memory, and the like. Then, the game program stored in the optical disc 4 is read by the main memory, and the CPU 10 starts executing the game program. The flow chart shown in FIG. 14 is a flow chart showing processing executed after the above processing is completed. It is noted that in the following description, the processing shown in FIG. 14 is executed by the CPU 10, but alternatively, the CPU 10 and the GPU 11*b* may cooperate to execute a part of the processing (e.g. processing of generating and displaying a game image).

At a step S1, the CPU 10 executes initialization processing concerning the game processing. More specifically, the CPU 10 reads from the optical disc 4 image data and the like used as a game image. At a step S2 after the step S1, the CPU 10 displays a staff notation on the screen of the television 2 using an image read at the step S1. Processing of a step S3 is executed after the step S2.

At the step S3, the CPU 10 reads from the optical disc 4 data (music data, chord data, scale data, and output possible range data) concerning a piece of music to be played, stores the data in the main memory. It is noted that the piece of music to be played may be a piece of music which is selected by the player from pieces of music, data of which are stored in the optical disc 4, or may be a piece of music which is selected automatically by the CPU 10. Processing of a step S4 is executed after the step S3.

At the step S4, the CPU 10 displays the musical score of a target part to be played by the player, among parts of the piece of music to be played, so as to be superimposed on the staff notation displayed on the screen. Here, the musical score of the first one bar of the target part is displayed. It is noted that the musical score to be displayed is read from the optical disc 4 at the step S3, and displayed according to the contents of the music data 63 stored in the main memory. Processing of a step S5 is executed after the step S4.

At the step S5, the CPU 10 starts playing the other parts other than the target part among the parts of the piece of music to be played. The playing of the other parts is executed according to the contents of the music data 63 stored in the main memory. As described above, according to the present embodiment, the other parts other than the target part are automatically outputted by the game apparatus 3. Thus, the player performs playing operation for the target part while listening to the playing of the other parts. This makes it easy for the player to perform the playing operation. It is noted that in an alternative embodiment, the game apparatus 3 may not play the other parts. Processing of a step S6 is executed after the step S5.

The playing of the piece of music is started by the step S5. It is noted that when the playing is started, the CPU 10 starts counting a tick number. At the time of start of playing, the CPU 10 stores data indicating the first sound (a sound the tick number of the output timing of which is the minimum), among the sounds which form the target part, as the next target sound data 70 in the main memory. A processing loop of the steps S6 to S15 executed after the step S5 is executed every one-frame time (e.g. every 1/60 sec).

At the step S6, the CPU 10 calculates the current tick number using a program for calculating the current tick number. Data of the calculated current tick number is stored as the current tick number data 67 in the main memory. Processing of the step S7 is executed after the step S6.

At the step S7, the CPU 10 determines whether or not there is a need to change the contents (notes, rests, and like) of the musical score displayed on the screen of the television 2. This determination is executed using the current tick number which can be known by referring to the current tick number data 67 stored in the main memory. In other words, the CPU 10 determines whether or not the position on the musical score corresponding to the current tick number is within the region of the musical score currently displayed on the screen. Then, when the position on the musical score corresponding to the current tick number is not within the region of the musical score currently displayed on the screen, the CPU 10 determines that there is a need to change the display of the musical score displayed on the screen. On the other hand, when the position on the musical score corresponding to the current tick number is within the region of the musical score currently displayed on the screen, the CPU 10 determines that there is no need to change the display of the musical score displayed on the screen. When the determination result of the step S7 is positive, processing of the step S8 is executed. On the other had, when the determination result of the step S7 is negative, processing of the step S8 is skipped, and processing of the step S9 is executed.

At the step S8, the CPU 10 updates the contents of the musical score displayed on the screen. In the present embodiment, a bar of the musical score is displayed at the same time. Thus, the musical score of the next bar after the bar which has been displayed is displayed by the step S8. The processing of the step S9 is executed after the step S8.

At the step S9, the CPU 10 displays the timing bar so as to be superimposed on the musical score displayed on the screen. The display position of the timing bar is determined based on the current tick number. In other words, the timing bar is displayed at a position on the musical score which corresponds to the current tick number. It is noted that the position on the musical score which corresponds to the current tick number can be specified, for example, by calculating a ratio of the current tick number to a tick number indicating the entire length of the piece of music. The processing of the step S9 is repeatedly executed, so that the timing bar moves as the playing proceeds. Processing of the step S10 is executed after the step S9.

At the step S10, the CPU 10 determines whether or not the output timing of a sound forming the melody of the piece of music has come. Here, since the sound, at the current time, the output timing of which comes next is the next target sound, whether or not the output timing of the next target sound has come is determined at the step S10. More specifically, the determination of the step S10 is executed based on the current tick number indicated by the current tick number data 67 and the output timing of the next target sound indicated by the next target sound data 70. In other words, when the current tick number is equal to or larger than the tick number indicating the output timing of the next target sound, the CPU 10 determines that the output timing of the next target sound has come. On the other hand, when the current tick number is smaller than the tick number indicating the output timing of the next target sound, the CPU 10 determines that the output timing of the next target sound has not come. When the determination result of the step S10 is positive, processing of the steps S11 and S12 is executed. On the other hand, when the determination result of the step S10 is negative, the processing of the steps S11 and S12 is skipped, and processing of the step S13 is executed.

The step S10 is repeatedly executed during the playing, so that the game apparatus 3 can sequentially detect that the output timing of each of the sounds which form the melody of the piece of music has come. It is noted that as described above, the target melody area is the time region from the output timing of the target sound as the beginning to the output timing of the next target sound as the end. Thus, the determination processing of the step S10 is processing for determining whether or not the current time reaches the end of the target melody area, or whether or not the target melody area is changed.

At the step S11, the CPU 10 changes the target melody area. More specifically, the CPU 10 changes the contents of the target sound data 69 and the next target sound data 70. The contents of the target sound data 69 are changed so as to indicate a sound indicated by the next target sound data 70 before the change. The contents of the next target sound data 70 are changed so as to indicate a sound after the sound indicated by the target sound data 69 after the change. As described above, the target melody area is changed by changing the target sound and the next target sound. Processing of the step S12 is executed after the step S11.

At the step S12, the CPU 10 resets the value of the input counter. More specifically, the contents of the input counter data 71 stored in the main memory are changed so as to indicate "zero". Processing of the step S13 is executed after the step S12.

At the step S13, the CPU 10 accepts an input (a sound production input) for outputting a sound, and determines whether or not the input is performed. In the present embodiment, the sound production input is an input with respect to a predetermined button (e.g. the A button 32d) of the controller 5. More specifically, at the step S13, whether or not the predetermined button is pressed determined by referring to the operation data 61 stored in the main memory. Then, when the predetermined button is pressed, it is determined that the sound production input is performed, and when the predetermined button is not pressed, it is determined that the sound production input is not performed. When the determination result of the step S13 is positive, processing of the step S14 is executed. On the other hand, when the determination result of the step S13 is negative, the processing of the step S14 is skipped, and processing of the step S15 is executed.

It is noted that although the sound production input is the input with respect to the predetermined button of the controller 5 in the present embodiment, an input manner for the sound production input may be any manner. In an alternative embodiment, the game apparatus 3 may determine that a sound production input is performed, for example, when a predetermined movement of the controller 5 is performed (e.g. the controller 5 is moved from up to down). It is noted that the movement of the controller 5 can be calculated using the information of the acceleration detected by the acceleration sensor 37.

At the step S14, the CPU 10 executes sound production processing. The sound production processing is processing for causing the speaker 2a of the television 2 to output a sound according to a sound production input by the player. The following will describe in detail the sound production processing with reference to FIG. 15.

Figure 15:
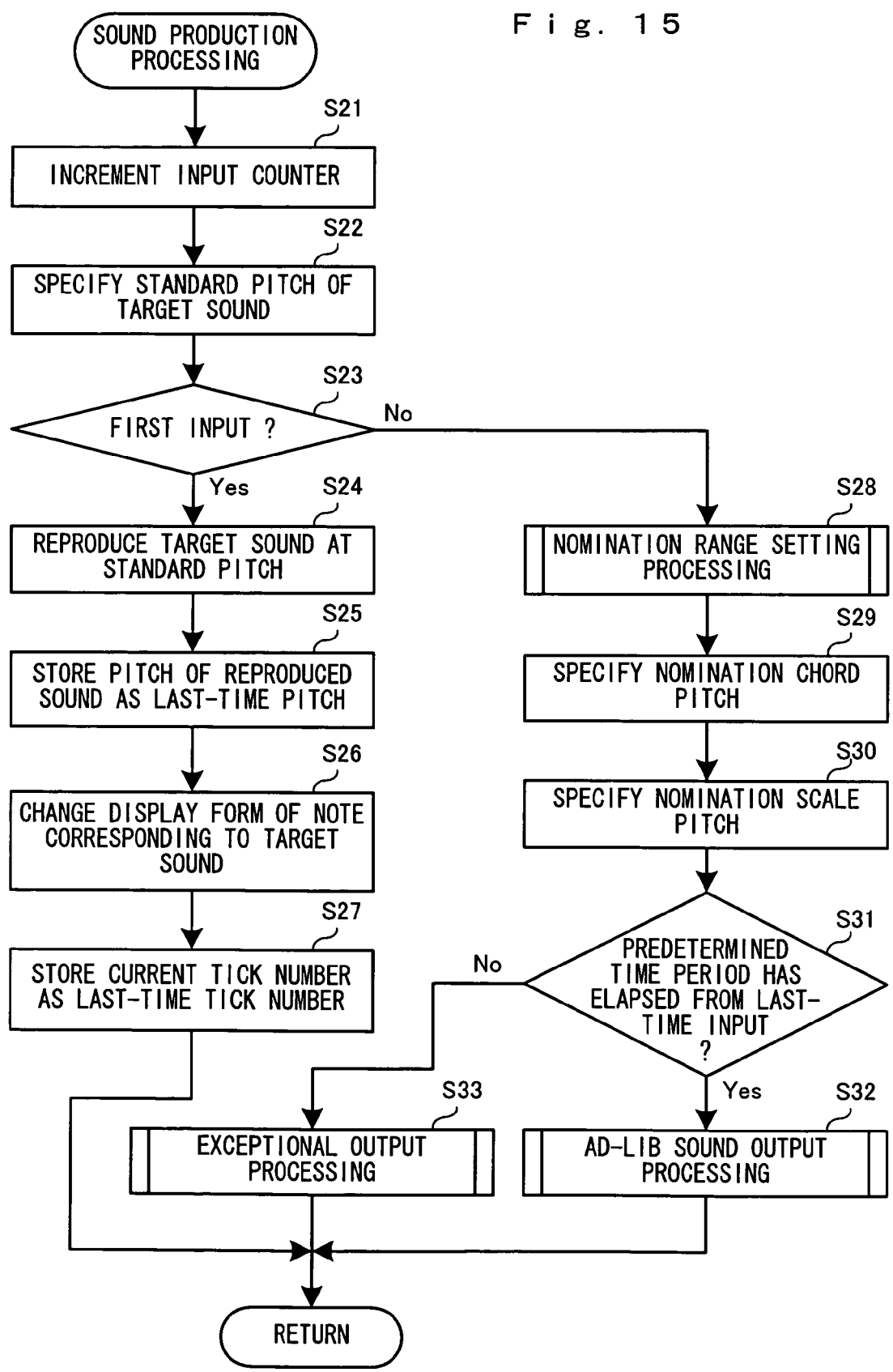
FIG. 15 is a flow chart showing a procedure of sound production processing (a step S14) shown in FIG. 14.

FIG. 15 is a flow chart showing a procedure of the sound production processing (the step S14) shown in FIG. 14. In the sound production processing, at a step S21, the CPU 10 increments the value of the input counter. More specifically, the value indicated by the input counter data 71 is changed into a value which is obtained by adding one to the value indicated currently by the input counter data 71. By the processing of the steps S10 to S12 and the step S21, the value of the input counter indicates a number of times which a sound production input is performed in a target melody area. In other words, the CPU 10 can know how may times a sound production input is performed in the target melody area by referring to the input counter data 71. Processing of a step S22 is executed after the step S21.

At the step S22, the CPU 10 specifies the standard pitch of the target sound. The standard pitch of the target sound is specified by referring to the music data 63 and the target sound data 69. More specifically, the CPU 10 specifies the output timing of the sound indicated by the target sound data 69 by referring to the music data 63. Processing of a step S23 is executed after the step S22.

At the step S23, the CPU 10 determines whether or not an input (a sound production input) performed in the current processing loop (the processing loop of the steps S6 to S15) is the first input in the target melody area. More specifically, when the input counter data 71 indicates "one", this input is determined to be the first input in the target melody area, and when the input counter data 71 indicates the value of "two" or greater, this input is determined not to be the first input in the target melody area. When the determination result of the step S23 is positive, processing of a step S24 is executed. On the other hand, when the determination result of the step S23 is negative, processing of a later-described step S28 is executed.

At the step S24, the CPU 10 causes the speaker 2a of the television 2 to output (reproduce) the target sound at the standard pitch specified at the step S23. In other words, the pitch of the sound to be outputted is the pitch according to the musical score, which is determined in the music data 63. In addition, the tone color and the quantity of the sound to be outputted are the tone color and the quantity according to the musical score. As described above, when the first input is performed in the target melody area, the game apparatus 3 outputs the target sound, which is associated with the target melody area, so as to be the sound according to the musical score. It is noted that when a sound outputted previously is still outputted at the step S24, the sound outputted previously is stopped, only the sound to be outputted at the step S24 this time is outputted. Processing of a step S25 is executed after the step S24.

At the step S25, the CPU 10 stores the pitch of the sound reproduced at the step S24 as the last-time pitch. More specifically, data indicating the pitch of the sound reproduced at the step S24 is stored as the last-time pitch data 75 in the main memory. Processing of a step S26 is executed after the step S25.

At the step S26, the CPU 10 changes a display form of the note corresponding to the target sound among notes displayed on the screen of the television 2. For example, the color of the note corresponding to the target sound is changed. This makes it easier for the player to know which sound on the musical score is outputted. Processing of a step S27 is executed after the step S26.

At the step S27, the CPU 10 stores the value of the current tick number as the last-time tick number. More specifically, the contents of the last-time tick number data 68 are updated to the value of the tick number indicated by the current tick number data 67. Thus, the tick number at the time when the sound is outputted last can be stored as the last-time tick number. The CPU 10 terminates the sound production processing after the step S27.

Meanwhile, at the step S28, the CPU 10 executes nomination range setting processing. The nomination range setting processing is processing for setting the nomination range representing a range from which the pitch is selected in the case where the pitch of an ad-lib sound is selected at random. The following will describe in detail the nomination range setting processing with reference to FIG. 16.

Figure 16:
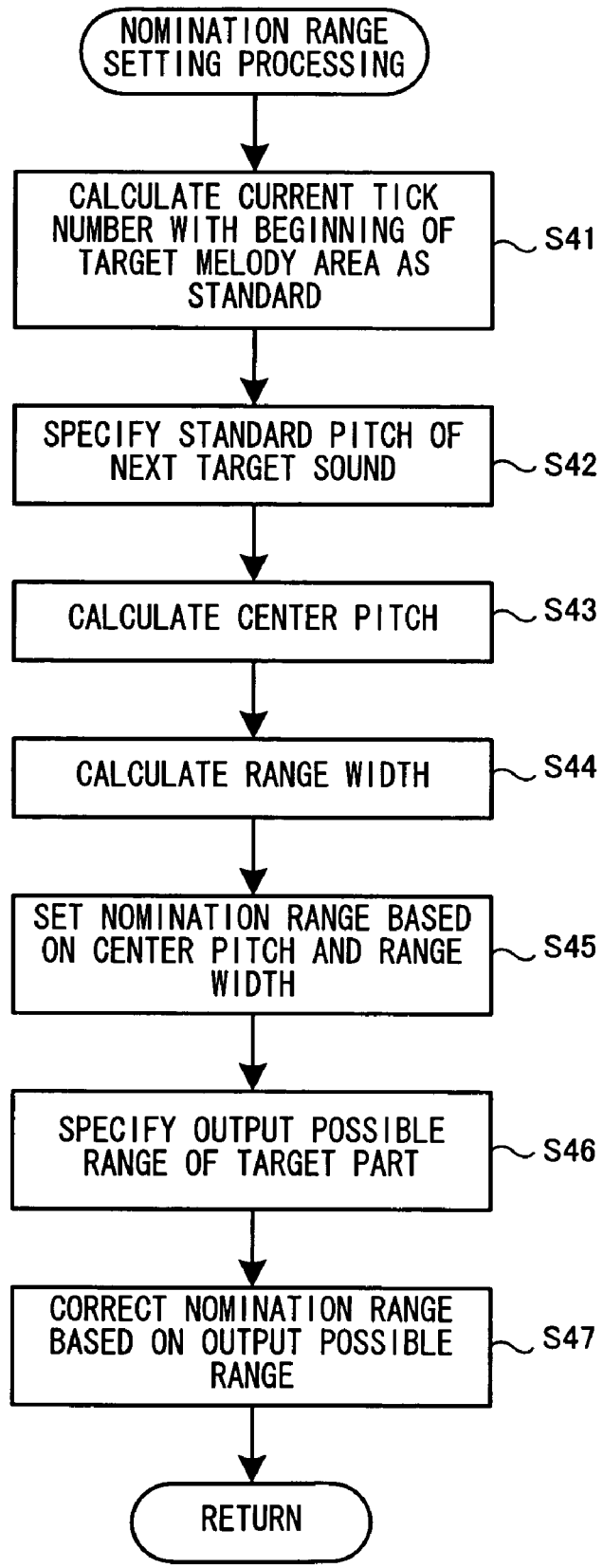
FIG. 16 is a flow chart showing a procedure of nomination range setting processing (a step S28) shown in FIG. 15.

FIG. 16 is a flow chart showing a procedure of the nomination range setting processing (the step S28) shown in FIG. 15. In the nomination range setting processing, at a step S41, the CPU 10 calculates the current tick number with the beginning of the target melody area as a standard, namely, a tick number from the beginning of the target melody area to the current time. The tick number calculated at the step S41 is obtained by subtracting the tick number of the beginning of the target melody area (or the tick number of the output timing of the target sound) from the current tick number. It is noted that the current tick number can be known by referring to the current tick number data 67. The tick number of the beginning of the target melody area can be known by referring to the target sound data 69 and the music data 63. Processing of a step S42 is executed after the step S41.

At the step S42, the CPU 10 specifies the standard pitch of the next target sound. The standard pitch of the next target sound is specified by referring to the music data 63 and the next target sound data 70. More specifically, the CPU 10 specifies the output timing of the sound indicated by the next target sound data 70 by referring to the music data 63. Processing of a step S43 is executed after the step S42.

In the steps S43 to S45, the nomination range is calculated. In the present embodiment, the pitch (referred to as a "center pitch") of a center of the nomination range is calculated, and then a width from the center pitch to the boundary of the nomination range is calculated to calculate the nomination range. The following will describe in detail the steps S43 to S45 with reference to FIG. 17.

Figure 17:
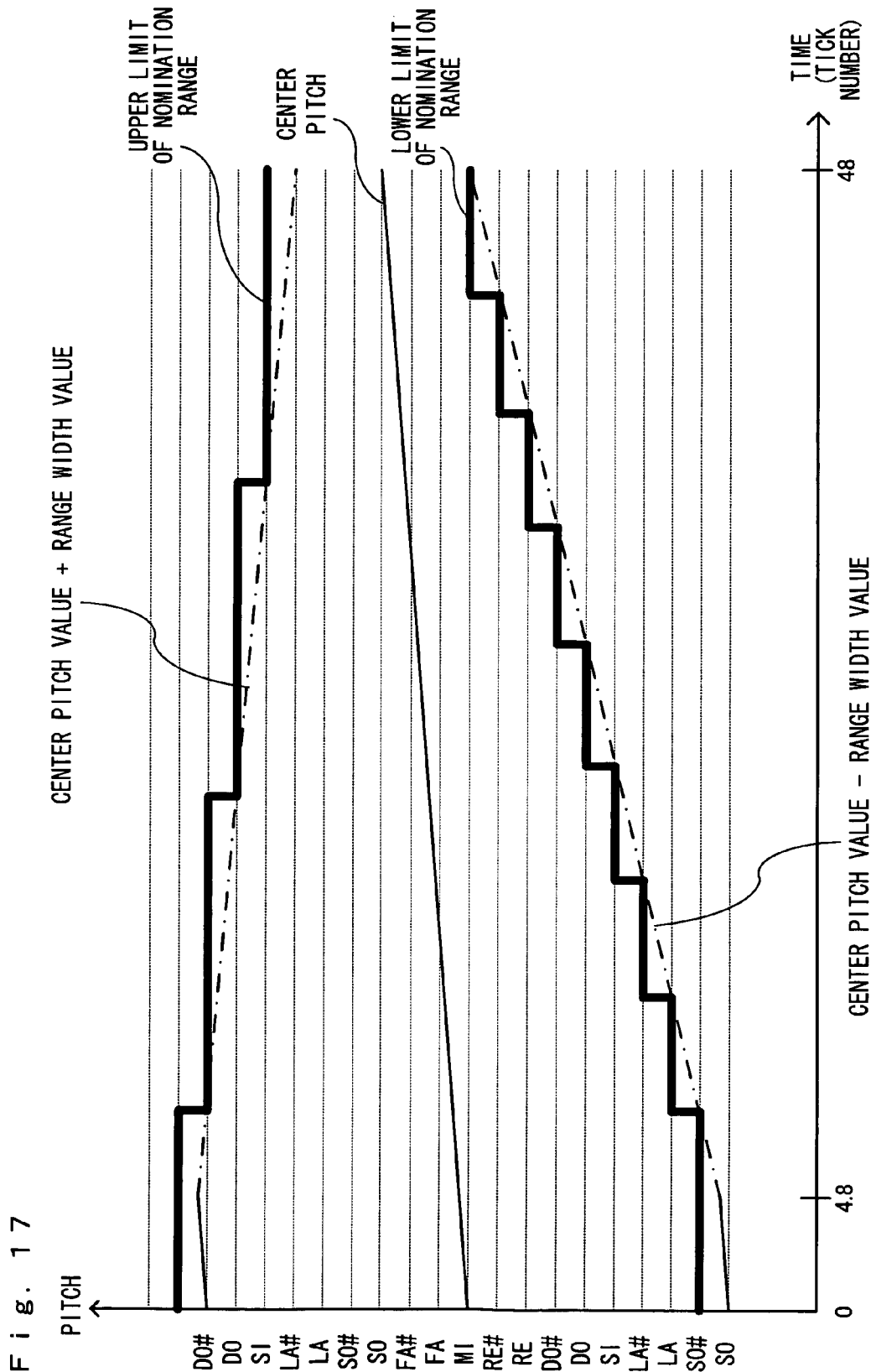
FIG. 17 shows an example of a calculated nomination range.

FIG. 17 shows an example of the calculated nomination range. In the graph shown in FIG. 17, the horizontal axis indicates a time, namely, a tick number with the beginning of the target melody area set as a standard (zero). FIG. 17 shows the case where the duration of the target melody area is 48 ticks. In the processing of the steps S43 and S44, a pitch is represented by a numeric value, and the vertical axis of the graph in FIG. 17 indicates the numeric value. FIG. 17 shows changes of the nomination range in the time region of the target melody area.

At the step S43, the CPU 10 calculates the center pitch. In the present embodiment, the center pitch is calculated so as to be changed from the standard pitch of the target sound to the standard pitch of the next target sound as time proceeds in the target melody area (see the thin solid line shown in FIG. 17). More specifically, a center pitch h at the current time can be calculated according to the following equation (1):

$$h=(h2-h1)t/T+h1. \tag{1}$$

In the equation (1), a variable t denotes the current tick number (the tick number from the beginning of the target melody area as the standard), and a variable T denotes a width (a length) of the target melody area. A variable h1 denotes the standard pitch of the target sound, and a variable h2 denotes the standard pitch of the next target sound.

At the step S44, the CPU 10 calculates a range width. In the present embodiment, the range width is calculated so that the width of the nomination range is kept constant during a predetermined time period from the beginning of the target melody area and then the width of the nomination range is gradually decreased as time proceeds (see the dashed line shown in FIG. 17). In the present embodiment, as shown in FIG. 17, the predetermined time period is a time length (T/10) of a predetermined rate (specifically, 10%) for the time length (T) of the target melody area. In the present embodiment, as shown in FIG. 17, the range width is a width of nine and half notes at the start point (the beginning) of the target melody area, and calculated so as to be converged to a width of three and half notes at the end point (the end) of the target melody area. Therefore, in the present embodiment, a range width w at the current time can be calculated according to the following equation (2):

$$w = 29/3 - 20t/3T. \quad (2)$$

By the equation (2), as shown in FIG. 17, the width of the nomination range can be decreased by a constant amount with respect to elapse of time. It is noted that in an alternative embodiment, the width of the nomination range may be decreased at a constant rate with respect to elapse of time.

At the step S45, the CPU 10 sets the nomination range based on the center pitch h calculated at the step S42 and the range width w calculated at the step S43. More specifically, the upper limit pitch of the nomination range is determined by a result of adding the value w of the range width to the value h of the center pitch. It is noted that since this adding result is a numeric value, there may be the case where the value does not correspond to an actual pitch. For example, the value of the adding result may be a value indicating a pitch between "do" and "do#". In this case, in the present embodiment, the CPU 10 rounds up the value of the adding result to determine the pitch. For example, when the adding result is a value between "do" and "do#", the pitch is determined to be "do#". On the other had, the lower limit pitch of the nomination range is determined by a result of subtracting the value w of the range width from the value h of the center pitch. In the case of the lower limit pitch of the nomination range, similarly to the case of the upper limit pitch, there may be the case where the value of the subtracting result does not correspond to an actual pitch. In this case, the CPU 10 rounds up the value of the subtracting result to determine the pitch. The thick line in FIG. 17 indicates the nomination range which is set as described above. It is noted that although the numeric value is rounded up when a numeric value indicating the pitch does not correspond to an actual pitch in the present embodiment, in an alternative embodiment, the numeric value may be rounded down or may be rounded off. Data indicating the nomination range which is set at the step S45 is stored as the nomination range data 72 in the main memory.

As described for the steps S43 to S45, in the present embodiment, the nomination range is set based on the pitch of the target sound and the pitch of the next target sound. More specifically, the center pitch is calculated so as to be changed from the standard pitch of the target sound to the standard pitch of the next target sound. Thus, the nomination range is set so as to change the range including the standard pitch of the target sound to the range including the standard pitch of the next target sound as time proceeds in the target melody area. Although described in detail later, the pitch of an ad-lib sound is selected from the nomination range. Thus, a pitch which is not too high and not too low as compared to the target sound and the next target sound and which connects naturally the target sound to the next target sound is selected as the pitch of the ad-lib sound. According to this, in the case where the pitch of the ad-lib sound is determined at random, the pitch of the ad-lib sound can be determined to be a natural pitch so as to follow the melody of the musical score.

At the step S46, the CPU 10 refers to the output possible range data 66 stored in the main memory, and specifies the output possible range of the target part. At a step S47 after the step S46, the CPU 10 corrects the above nomination range based on the output possible range of the target part. The nomination range is corrected so that a range outside the output possible range is removed therefrom. More specifically, when the upper limit of the nomination range before the correction is higher than the upper limit of the output possible range, the upper limit of the nomination range after the correction becomes the upper limit of the output possible range. When the lower limit of the nomination range before the correction is lower than the lower limit of the output possible range, the lower limit of the nomination range after the correction becomes the lower limit of the output possible range. It is noted that when the upper limit of the nomination range before the correction is lower than the upper limit of the output possible range and the lower limit of the nomination range before the correction is higher than the lower limit of the output possible range, correction is not performed. The contents of the nomination range data 72 stored in the main memory are updated to data indicating the nomination range corrected thus.

Figure 18:
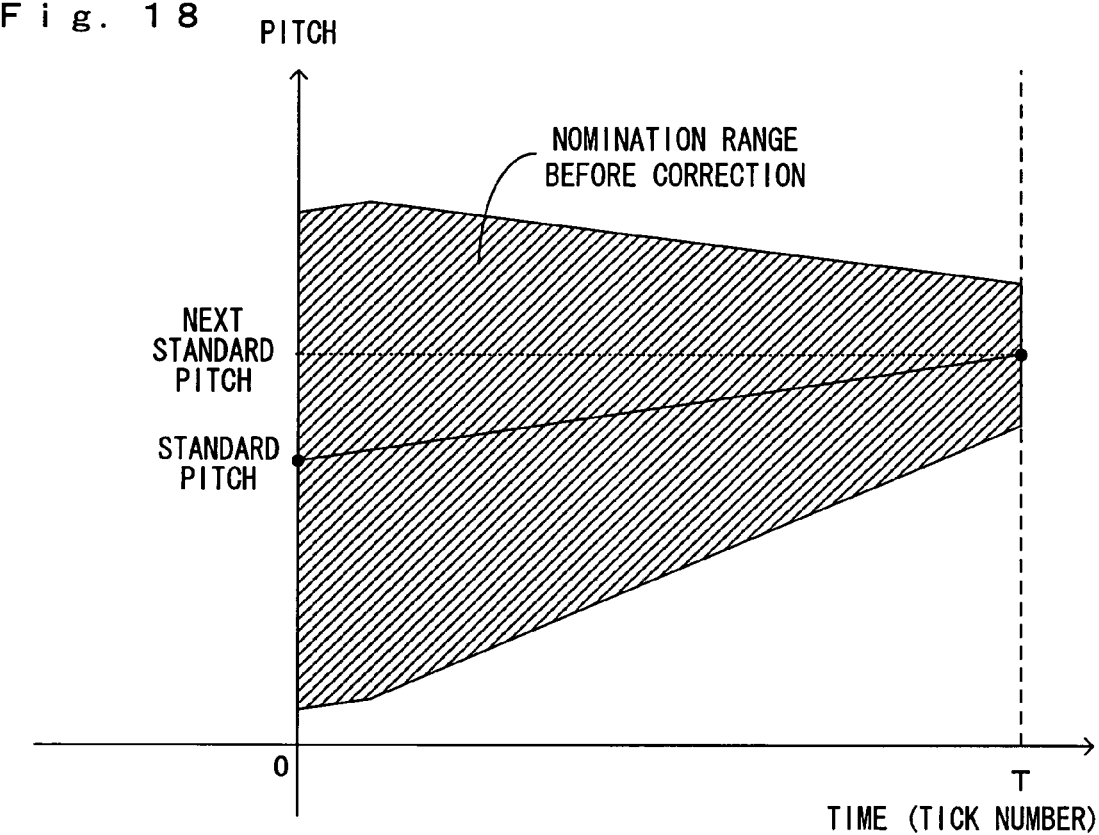
FIG. 18 shows a nomination range before correction.
Figure 19:
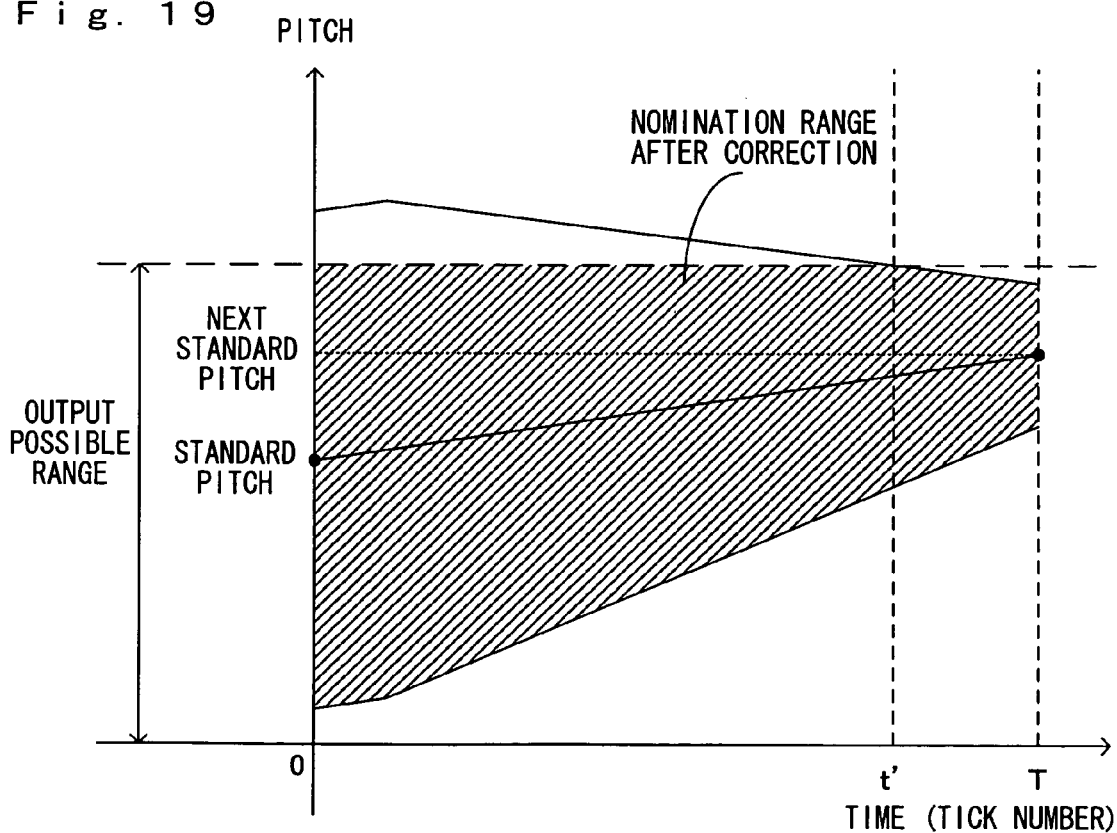
FIG. 19 shows a nomination range after correction.

FIG. 18 shows the nomination range before the correction, and FIG. 19 shows the nomination range after the correction. In FIGS. 18 and 19, the horizontal axis indicates a time, and the vertical axis indicates a pitch. In other words, FIGS. 18 and 19 shows a change of the nomination range in the time region of the target melody area. In FIG. 18, the nomination range before the correction, which is set at the step S45, is indicated as a shaded area. As shown in FIG. 19, in a time region in which the tick number t calculated at the step S41 satisfies an inequality, $0 \leq t < t'$, when the upper limit of the nomination range before the correction is higher than the upper limit of the output possible range, the upper limit of the nomination range is corrected to the upper limit of the output possible range. Thus, the nomination range after the correction becomes a shaded area indicated in FIG. 19. It is noted that in a time region in which the tick number t satisfies an inequality, $t' \leq t < T$, since the upper limit of the nomination range before the correction is lower than the upper limit of the output possible range, the upper limit of the nomination range is not corrected.

As described above, according to the processing of the step S47, the nomination range is corrected so as not to include the range outside the output possible range of the target part. Thus, the ad-lib sound is not outputted at a pitch outside the output possible range of the target part. For example, if a sound the pitch of which is too high is outputted in a part of a musical instrument (e.g. a contrabass) having a relatively low range, there is a fear that the melody of the playing result becomes unnatural. The processing of the step S47 is processing for preventing the playing result from becoming unnatural due to output of a sound at a pitch at which a sound is not normally outputted by the music instrument of the target part. After the step S47, the CPU 10 terminates the nomination range setting processing.

Referring back to FIG. 15, processing of a step S29 is executed after the nomination range setting processing of the step S28. Specifically, at the step S29, the CPU 10 specifies the nomination chord pitches. As described above, the nomination chord pitches are the pitches, among the pitches included in the nomination range, the pitch name of each of which corresponds to a pitch name of the chord sound to be used at the current time. More specifically, the CPU 10 refers to the chord data 64 and the current tick number data 67 which are stored in the main memory, and specifies the pitch names of the chord sound to be used at the current time. Then, the CPU 10 refers to the nomination range data 72, and selects the pitches which correspond to the specified pitch names from the pitches included in the nomination range. For example, there is considered the case where the chord sound to be used at the current time is "do-mi-so" and the nomination range is from "si" the pitch of the octave of which is indicated by "two" to "do" the pitch of the octave of which is indicated by "four". In this case, the nomination chord pitches are "do", "mi", and "so" the pitch of the octave of which is indicated by "three", and "do" the pitch of the octave of which is indicated by "four". Data indicating the pitches which are specified at the step S29 is stored as the nomination chord pitch data 73 in the main memory. It is noted that depending on the nomination range and the current chord sound, there may be the case where there is no pitch specified as the nomination chord pitch. In this case, data indicating that there is no nomination chord pitch is stored as the nomination chord pitch data 73 in the main memory. After the above step S29, processing of a step S30 is executed.

At the step S30, the CPU 10 specifies the nomination scale pitches. The nomination scale pitches are the pitches, among the pitches included in the nomination range, the pitch name of each of which corresponds to a pitch name of the scale sound to be used at the current time (a) and each of which is the closest to the last-time pitch (but different from the last-time pitch) (b). The last-time pitch is a pitch which is selected as the pitch of the sound to be outputted in the sound production processing last time. The last-time pitch is indicated by the last-time pitch data 75. More specifically, the CPU 10 refers to the scale data 65 and the current tick number data 67 which are stored in the main memory, and specifies the pitch names of the scale sound to be used at the current time. Next, the CPU 10 refers to the nomination range data 72, and selects the pitches which correspond to the specified pitch names from the pitches included in the nomination range. Further, the CPU 10 refers to the last-time pitch data 75, and selects the pitches which are the closest to the last-time pitch from the selected pitches. For example, there is considered the case where the scale sound used at the current time is "do-re-mi-fa-so-ra-si" and the nomination range is from "si" the pitch of the octave of which is indicated by "two" to "do" the pitch of the octave of which is indicated by "four". In this case, if the last-time pitch is "re" the pitch of the octave of which is indicated by "three", the nomination scale pitches are "do" and "mi" the pitch of the octave of which is indicated by "three". Data indicating the pitches specified at the step S30 is stored as the nomination scale pitch data 74 in the main memory. It is noted that depending on the nomination range and the current scale sound, there may be the case where there is no pitch specified as the nomination scale pitch. In this case, data indicating that there is no nomination scale pitch is stored as the nomination scale pitch data 74 in the main memory. After the above step S30, processing of a step S31 is executed.

As described above, in the present embodiment, in the case where the second and later inputs are performed in an target melody area, nominees for the pitch of the ad-lib sound to be outputted are set at the steps S28 to S30. At a later-described step S32, a pitch is selected from the set nominees, and the ad-lib sound is outputted at the selected pitch.

At the step S31, the CPU 10 determines whether or not a predetermined time period has elapsed from the sound production input performed last time. The determination of the step S31 is executed by referring to the current tick number data 67 and the last-time tick number data 68. More specifically, when a difference between the value of the current tick number and the value of the last-time tick number is equal to or larger than a predetermined value, it is determined that the predetermined time period has elapsed from the sound production input performed last time. On the other hand, when the difference between the value of the current tick number and the value of the last-time tick number is smaller than the predetermined value, it is determined that the predetermined time period has not elapsed from the sound production input performed last time. It is noted that in the present embodiment, the predetermined time period (a predetermined value) is set, for example, to six ticks. When the determination result of the step S31 is positive, processing of the step S32 is executed. On the other hand, when the determination result of the step S31 is negative, processing of a later-described step S33 is executed.

At the step S32, the CPU 10 executes ad-lib sound output processing for outputting an ad-lib sound. The following will describe in detail the ad-lib sound output processing with reference to FIG. 20.

Figure 20:
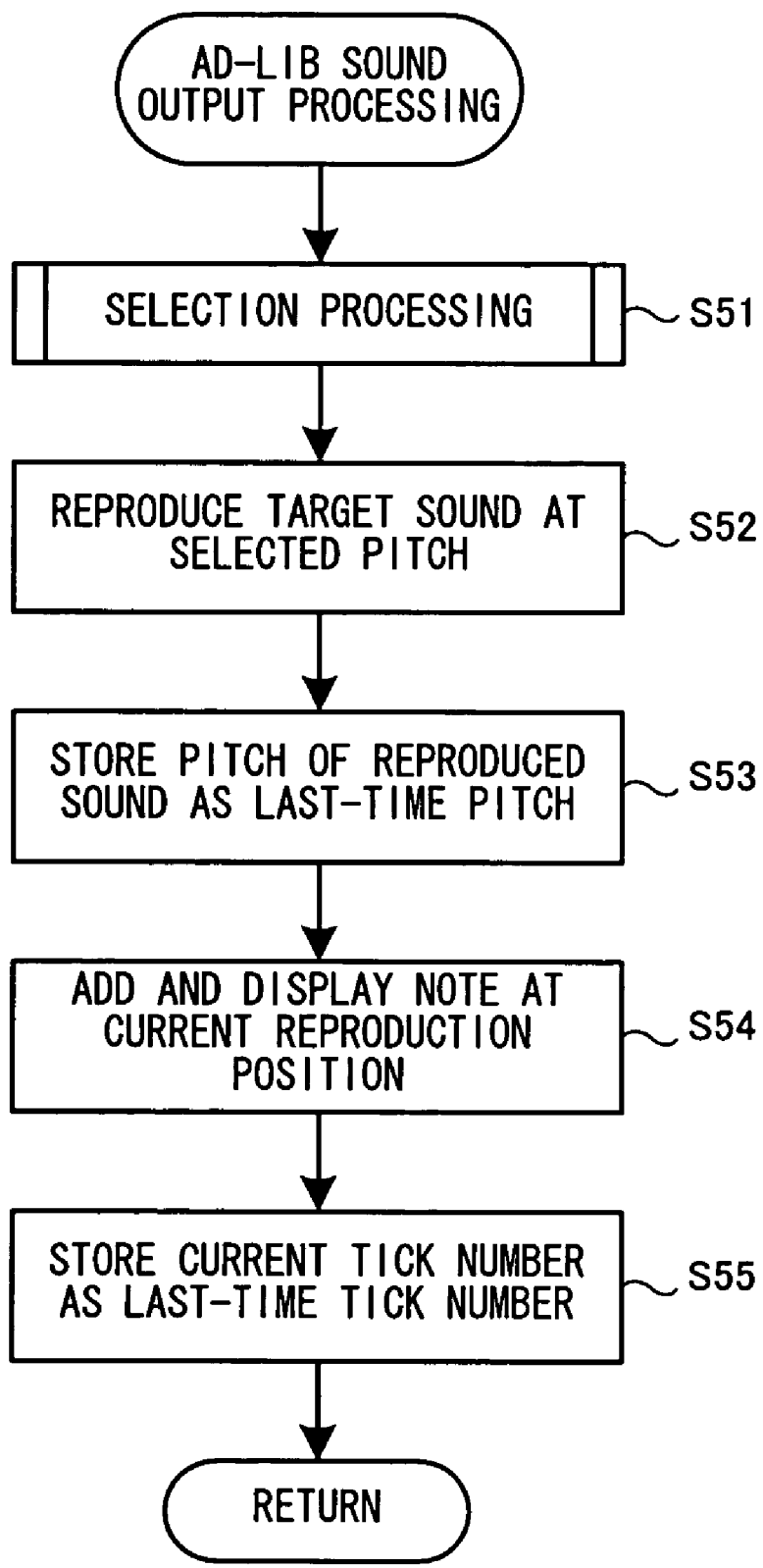
FIG. 20 is a flow chart showing a procedure of ad-lib sound output processing (a step S32) shown in FIG. 15.

FIG. 20 is a flow chart showing a procedure of the ad-lib sound output processing (the step S32) shown in FIG. 15. In the ad-lib sound output processing, at a step S51, the CPU 10 executes selection processing. The selection processing is processing of selecting the pitch of a sound to be outputted as the ad-lib sound from the nominees. The following will described in detail the selection processing with reference to FIG. 21.

Figure 21:
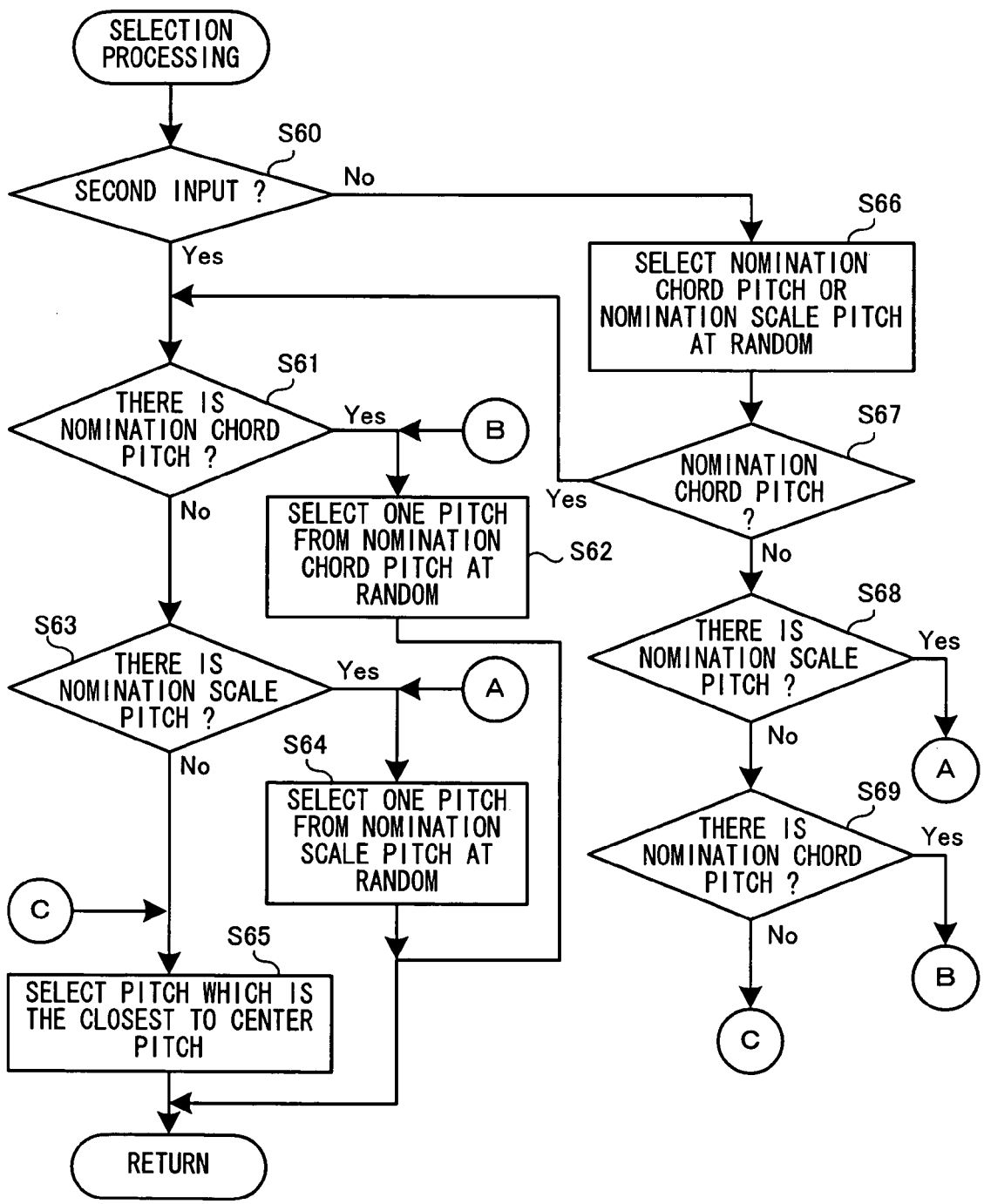
FIG. 21 is a flow chart showing a procedure of selection processing (a step S51) shown in FIG. 20.

FIG. 21 is a flow chart showing a procedure of the selection processing (the step S51) shown in FIG. 20. In the selection processing, at a step S60, the CPU 10 determines whether or not an input (a sound production input) performed in the processing loop (the processing loop of the steps S6 to S15) this time is the second input in the target melody area. The determination of the step S60 is executed by referring to the input counter data 71. More specifically, when the input counter data 71 indicates "two", it is determined that this input is the second input in the target melody area. When the input counter data 71 indicates a value of three or more, it is determined that this input is not the second input in the target melody area (or this input is the third or later input). When the determination result of the step S60 is positive, processing of a step S61 is executed. On the other hand, when the determination result of the step S60 is negative, processing of a later-described step S66 is executed.

At the step S61, the CPU 10 determines whether or not there is a pitch which is specified as the nomination chord pitch at the above step S29. The determination of the step S61 is executed by referring to the nomination chord pitch data 73. When the determination result of the step S61 is positive, processing of a step S62 is executed. On the other hand, the determination result of the step S61 is negative, processing of a later-described step S63 is executed.

At the step S62, the CPU 10 selects a pitch from the nomination chord pitches at random. In the present specification, "selecting at random" means to select a different one for each time in a broad sense, and does not include the exact meaning of random nature. Thus, a method of selecting a pitch at random may be a method using random numbers, or a method performed such that the selection result has regularity. After the step S62, the CPU 10 terminates the selection processing.

At the step S63, the CPU 10 determines whether or not there is a pitch which is specified as the nomination scale pitch at the above step S30. The determination of the step S63 is performed by referring to the nomination scale pitch data 74. When the determination result of the step S63 is positive, processing of a step S64 is executed. On the other hand, when the determination result of the step S63 is negative, processing of a step S65 is executed.

At the step S64, the CPU 10 selects one pitch from the nomination scale pitches at random. It is noted that a method of selecting a pitch at random can be the same as that at the step S62. After the step S64, the CPU 10 terminates the selection processing.

At the step S65, the CPU 10 selects a pitch which corresponds to a pitch name of the chord sound used at the current time and is the closest to the above center pitch. Thus, one pitch can be reliably determined. The case where the step S65 is executed is the case where both of the determination results of the steps S61 and S63 are negative, namely, the case where there is no pitch which is specified as the nomination chord pitch or the nomination scale pitch. In other words, the processing of the step S65 is processing for reliably selecting the pitch of an ad-lib sound even in the case where there is no nominee for random selection. It is noted that the center pitch used at the step S65 is a pitch indicated by the value calculated at the step S43. It is noted that in the case where the value calculated at the step S43 does not correspond to any actual pitch, the calculated value is rounded up to determine the center pitch. After the step S65, the CPU 10 terminates the selection processing.

Meanwhile, at the step S66, the CPU 10 selects the nomination chord pitch or the nomination scale pitch at random. At the following step S67, the CPU 10 determines whether or not the nomination chord pitch is selected at the step S66. When the determination result of the step S67 is positive, the processing of the step S61 is executed. On the other hand, when the determination result of the step S67 is negative, processing of a step S68 is executed.

At the step S68, the CPU 10 determines whether or not there is a pitch which is specified as the nomination scale pitch at the above step S30. The processing of the step S68 is the same as that of the above step S63. When the determination result of the step S68 is positive, the processing of the above step S64 is executed. On the other had, when the determination result of the step S68 is negative, processing of a step S69 is executed.

At the step S69, the CPU 10 determines whether or not there is a pitch which is specified as the nomination chord pitch 72. at the above step S29. The processing of the step S69 is the same as that of the above step S61. When the determination result of the step S69 is positive, the processing of the above step S62 is executed. On the other hand, when the determination result of the step S69 is negative, the processing of the above step S65 is executed.

As described above, in the selection processing, a method of selecting the pitch of the ad-lib sound is different between the case where the second input is performed in a target melody area (YES at the step S60) and the case where the third input is performed in the target melody area (No at the step S60). More specifically, in the case where the second input is performed, selection from the nomination chord pitches is performed (the step S62), and when there is no nomination chord pitch (No at the step S61), selection from the nomination scale pitches is performed (the step S64). On the other hand, in the case where the third or later input is performed, it is determined which the nomination chord pitch or the nomination scale pitch has a priority (the steps S66 and S67). When the nomination chord pitch has the priority, selection is performed in the same method as that in the case where the second input is performed. On the other hand, when the nomination scale pitch has the priority, selection from the nomination scale pitches is performed (the step S64), and when there is no nomination scale pitch (No at the step S68), selection from the nomination chord pitches is performed (the step S62). It is noted that even in the case where the second input is performed, or even in the case where the third input is performed, when there is no nomination chord pitch and no nomination scale pitch, the processing of the step S65 is executed for reliably selecting a pitch. This is an end of the description of the selection processing.

Referring back to FIG. 20, processing of a step S52 is executed after the selection processing of the step S51. More specifically, at the step S52, the CPU 10 causes the speaker 2a of the television 2 to output (reproduce) an ad-lib sound at the pitch which is selected at the selection processing. It is noted that in the present embodiment, the tone color and the quantity of the sound to be outputted are the tone color and the quantity according to the musical score. Thus, the ad-lib sound the pitch of which is determined at random is outputted. In addition, in the case where a sound outputted previously is still outputted at the step S52, the sound outputted previously is stopped, and only the sound to be outputted at the step S52 this time is outputted. Processing of a step S53 is executed after the step S52.

At the step S53, the CPU 10 stores the pitch of the sound reproduced at the step S52 as the last-time pitch. The processing of the step S53 is the same as that of the above step S24. Processing of a step S54 is executed after the step S53.

At the step S54, the CPU 10 adds and displays a note to the position of the current time on the musical score displayed on the screen of the television 2. Thus, the player can intuitively recognize the output of the ad-lib sound and at which timing the ad-lib sound is outputted. It is noted that the added note may be of any kind (a crotchet and a quaver), and, for example, may be the same note as the note which is associated with the melody area at the current time. The note added and displayed at the step S54 may be displayed in a display form different from that for the notes on the original musical score. Processing of a step S55 is executed after the step S54.

At the step S55, the CPU 10 stores the value of the current tick number as the last-time tick number. The processing of the step S55 is the same as that of the above step S27. After the step S55, the CPU 10 terminates the ad-lib sound output processing.

Referring back to FIG. 15, at the step S33, the CPU 10 executes exceptional output processing. Normally, in the case where the second input is performed in a melody area, the ad-lib sound output processing (the step S 32) is executed thereby to output the ad-lib sound the pitch of which is determined at random. However, since the sounds overlap with each other in the case where a time period from the time when a sound is outputted last time to the time when a sound is outputted next time is short, if a pitch is determined at random, there is a fear that the sound listened to by the player becomes unnatural or gives an unpleasant impression to the player. In the present embodiment, in the case where a time period from the time when a sound is outputted last time to the time when a sound is outputted next time is short (No at the step S31), the exceptional output processing is executed. In the exceptional output processing, the pitch of a sound to be outputted is determined in a method different from that in the ad-lib sound output processing. The following will describe in detail the exceptional output processing with reference to FIG. 22.

Figure 22:
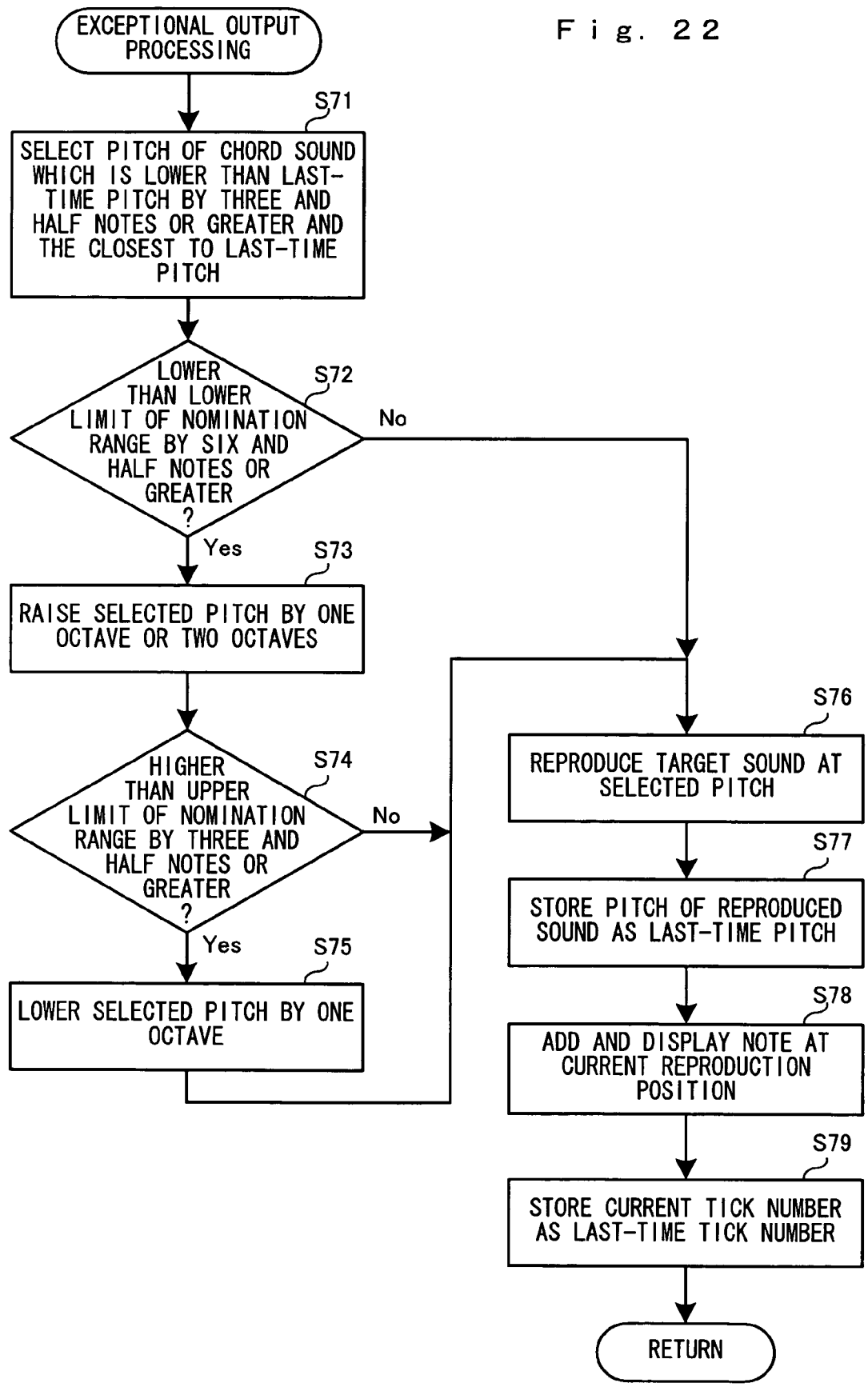
FIG. 22 is a flow chart showing a procedure of exceptional output processing (a step S32) shown in FIG. 15.

FIG. 22 is a flow chart showing a procedure of the exceptional output processing (the step S32) shown in FIG. 15. In the exceptional output processing, at a step S71, the CPU 10 selects the pitch of the ad-lib sound to be outputted based on the last-time pitch. In the present embodiment, the selected pitch of the ad-lib sound is a pitch of the chord sound which is lower than the last-time pitch by a predetermined value (e.g. three and half notes) or greater and the closest to the last-time pitch. The "chord sound" is the chord sound used at the current time, and can be known by referring to the chord data 64. Even in the case where the sound production inputs are performed consecutively during a short time period, an unnatural sound is prevented from being outputted by setting the pitch of the ad-lib sound to be outputted as described above. Processing of a step S72 is executed after the step S71.

At the step S72, the CPU 10 determines whether or not the pitch selected at the step S71 is lower than the lower limit of the nomination range by a predetermined value (e.g. six and half notes) or greater. Since the pitch which is lower than the last-time pitch is selected at the step S71, if the player performs sound production inputs for a short time period (more specifically, if the player presses a button repeatedly), the pitch of an ad-lib sound is lowered rapidly. The determination processing of the step S72 is processing for determining whether or not the pitch selected at the step S71 is not too low. When the determination result of the step S72 is positive, processing of a step S73 is executed. On the other hand, when the determination result of the step S72 is negative, processing of a step S76 is executed.

At the step S73, the CPU 10 corrects the pitch selected at the step S71 to a pitch higher by one octave or two octaves. It is noted that which the selected pitch is raised by one octave or two octaves is determined at random. In the case where the pitch selected at the step S71 is too low, the selected pitch is corrected to an appropriate pitch by the processing of the step S73. Processing of a step S74 is executed after the processing of the step S73.

At the step S74, the CPU 10 determines whether or not the pitch corrected at the step S73 is higher than the upper limit of the nomination range by a predetermined value (e.g. three and half notes) or greater. The determination processing of the step S74 is processing for determining whether or not the pitch corrected at the step S73 is not too high. When the determination result of the step S74 is positive, processing of a step S75 is executed. On the other hand, when the determination result of the step S74 is negative, processing of the step S76 is executed.

At the step S75, the CPU 10 corrects the pitch corrected at the step S73 to a pitch lower by one octave. In the case where the pitch corrected at the step S73 is too high (namely, in the case where the pitch is corrected too high at the step S73), the corrected pitch is corrected to an appropriate pitch by the processing of the step S75. The processing of the step S76 is executed after the step S75.

In the steps S76 to S79, the same processing as those of the above steps S52 to S55 is executed. Thus, in the exceptional output processing, an ad-lib sound is outputted at the pitch selected at the above steps S71 to S75. After the processing of the step S79, the CPU 10 terminates the exceptional output processing.

Referring back to FIG. 15, after the processing of the above steps S27, S32, and S33, the CPU 10 terminates the sound production processing shown in FIG. 15. Referring back to FIG. 14, after the sound production processing of the step S14, the processing of the step S15 is executed.

At the step S15, the CPU 10 determines whether or not the playing is terminated. The determination of whether or not the playing is terminated is executed based on the current tick number and the music data 63. More specifically, when the current tick number corresponds to the tick number at the end of the piece of music which is indicated by the music data 63, it can be determined that the playing is terminated. When the determination result of the step S15 is positive, the CPU 10 terminates the game processing shown in FIG. 14. On the other hand, when the determination result of the step S15 is negative, the processing of the step S6 is executed again. Then, the processing loop of the steps S6 to S15 is repeatedly performed until it is determined that the playing is terminated. This is the end of the description of the game processing executed by the game apparatus 3.

As described above, according to the present embodiment, the melody areas are set in a time region of the piece of music.

Thus, even when a sound production input is performed at a timing which is not a timing of a note on the musical score, a sound is outputted. Thus, in comparison with the conventional game in which a sound is outputted only at a predetermined timing, the player can output a sound at a free timing. This increases a degree of freedom of playing a piece of music, and the player can freely arrange the melody according to the musical score, with the result that the fun of the music playing game is enhanced.

In addition, according to the present embodiment, the game apparatus 3 outputs the target sound at the standard pitch with respect to the first sound production input in a melody area, and determines a pitch at random and outputs an ad-lib sound with respect to the second or later sound production input in the melody area. By outputting the target sound at the standard pitch with respect to the first sound production input, the melody of the playing result is prevented from becoming totally different from that of the musical score. Further, by outputting the ad-lib sound with respect to the second or later sound production input, a playing manner which is not provided by the conventional music playing game, such as freely adding the ad-lib sound to the melody of the musical score, can be offered.

(Alternative Embodiment Concerning Quantity and Loudness of ad-lib Sound)

In the above embodiment, the game apparatus 3 determines the pitch of an ad-lib sound at random, and outputs the ad-lib sound with a quantity and a loudness according to the musical score. In an alternative embodiment, the game apparatus 3 may determine the quantity and/or the loudness of the ad-lib sound as well as the pitch thereof at random, and may output the ad-lib sound. It is noted that in the case where the quantity and/or the loudness of the ad-lib sound are determined at random, similarly to the case of the pitch, it is preferable that a predetermined nominee area is set and the quantity and/or the loudness are selected from the nominee area in order to prevent the melody to which the ad-lib sound is added from becoming unnatural.

(Alternative Embodiment of Nomination Range)

In the above embodiment, the game apparatus 3 sets the standard pitch of the target sound and the standard pitch of the next target sound based on the nomination range (S28). In an alternative embodiment, the game apparatus 3 may not set the nomination range, and may select the pitch of an ad-lib sound from the chord sound and/or the scale sound which are used at the current time as nominees. For example, when the pitch of the ad-lib sound is selected from the chord sound used at the current time as a nominee, if the chord sound used at the current time is "do-mi-so", the pitch of the ad-lib sound may be selected from the pitches of the pitch names, "do", "mi", and "so" (regardless of the octave).

The method for setting a nomination range is not limited to that in the above embodiment, and may be another method. For example, the nomination range may be set only based on the standard pitch of the target sound or the standard pitch of the next target sound. More specifically, a range including the standard pitches of the target sound and the next target sound (more specifically, a range having a predetermined width with a standard pitch as a center thereof) may be the nomination range. In addition, at this time, similarly to the above embodiment, the width of the nomination range may be decreased as time proceeds. Further, for example, the output possible range in the above embodiment may be the nomination range.

In a still alternative embodiment, the game apparatus 3 may not set a nominee for the pitch of an ad-lib sound, and may determines the pitch of the ad-lib sound from the entire range.

In this case, it is not necessary to set the nomination range, the nomination chord pitch, and the nomination scale pitch.

(Alternative Embodiment Concerning Acceptance of Sound) Production Input

In the above embodiment, the game apparatus 3 outputs a sound in the case where an input is performed when or after the output timing of a sound forming the melody of the piece of music comes. However, even in the case where the player tries to perform an input exactly at the output timing of the sound, a timing of the input may be slightly earlier than the output timing of the sound. Thus, when the output timing of the sound is strictly determined, if an input is performed immediately before the coming of the output timing, there is a fear that a sound which is different from the player's intention is outputted. In order to prevent this, the game apparatus 3 may output the sound in the case where an input is performed a predetermined time period (e.g. about 8 ticks) or less before the output timing of a sound.

As described above, in order to allow the player to play a piece of music freely, the present invention can be used, for example, as a music playing program and a music playing apparatus for performing a music playing game.

While the invention has been described in detail, the foregoing description is in all aspects illustrative and not restrictive. It is understood that numerous other modifications and variations can be devised without departing from the scope of the invention.

What is claimed is:

1. A computer readable storage medium which stores a music playing program executed by a computer of a music playing apparatus for making a player play a melody of a predetermined piece of music, the music playing apparatus storing music data which indicates at least a pitch of each of sounds which form the melody of the predetermined piece of music and an output timing to output each of the sounds, the music playing program causing the computer to execute:

a detection step for sequentially detecting, among the sounds included in the music data, a target sound which is a sound an output timing of which comes after start of playing by the music data;

an input acceptance step for accepting an input from an input device of the music playing apparatus;

a first sound output step for outputting the target sound in the case where the input accepted at the input acceptance step is a first input when or after the output timing of the target sound detected at the detection step comes;

an ad-lib sound determination step for determining a pitch of an ad-lib sound as an arbitrary sound in the case where the input accepted at the input acceptance step is a second or later input after the output timing of the target sound detected at the detection step comes; and a second sound output step for outputting the ad-lib sound at the pitch which is determined at the ad-lib sound determination step.

2. The storage medium according to claim 1, wherein at the ad-lib sound determination step, the computer determines the pitch of the ad-lib sound based on at least one of a pitch of the target sound and a pitch of a next target sound an output timing of which comes after the target sound.

3. The storage medium according to claim 2, wherein the ad-lib sound determination step includes:

a nominee setting step for setting at least a nominee for the pitch of the ad-lib sound based on at least one of the pitch of the target sound and the pitch of the next target sound; and a selection step for selecting a pitch, from the nominee which is set at the nominee setting step, as the pitch of the ad-lib sound.

4. The storage medium according to claim 3, wherein the nominee setting step includes a nomination range setting step for setting a nomination range based on a first pitch which is the pitch of the target sound and a second pitch which is the pitch of the next target sound, and the nominee for the pitch of the ad-lib sound is set within the nomination range which is set at the nomination range setting step.

5. The storage medium according to claim 4, wherein at the nomination range setting step, the computer changes the nomination range from a range including the first pitch to a range including the second pitch as time proceeds during a target period from a time when the output timing of the target sound comes to a time when the output timing of the next target sound comes.

6. The storage medium according to claim 5, wherein the nominee setting step includes:

a center pitch calculation step for calculating a center pitch which is a center of the nomination range such that the center pitch changes from the first pitch to the second pitch as time proceeds during the target period; and a width setting step for setting a width of the nomination range, and at the nomination range setting step, the computer determines the nomination range from the center pitch and the width of the nomination range.

7. The storage medium according to claim 4, wherein at the nomination range setting step, the computer sets the nomination range such that the width of the nomination range is gradually decreased as time proceeds during a target period from a time when the output timing of the target sound comes to a time when the output timing of the next target sound comes.

8. The storage medium according to claim 7, wherein at the nomination range setting step, the computer keeps the width of the nomination range constant during a predetermined time period from the time when the output timing of the target sound comes.

9. The storage medium according to claim 7, wherein at the nomination range setting step, the computer changes the nomination range such that the width of the nomination range is decreased by a constant amount or at a constant rate with respect to elapse of time.

10. The storage medium according to claim 4, wherein the music data includes data which indicates a tone color of each sound forming the melody of the predetermined piece of music, the music playing apparatus further stores output possible range data in which an output possible range is associated with each tone color of sounds to be outputted, and at the nomination range setting step, the computer sets the nomination range so as to be within an output possible range of an output possible range data which is associated with a tone color of the target sound.

11. The storage medium according to claim 3, wherein the nominee setting step includes a nomination range setting step for setting as a nomination range a range which includes a first pitch which is the pitch of the target sound, and the nominee for the pitch of the ad-lib sound is set within the nomination range which is set at the nomination range setting step.

12. The storage medium according to claim 11, wherein at the nomination range setting step, the computer sets as the nomination range a range which has a predetermined width with the first pitch as a center thereof.

13. The storage medium according to claim 11, wherein at the nomination range setting step, the computer sets the nomination range such that the width of the nomination range is gradually decreased as time proceeds during a target period from a time when the output timing of the target sound comes to a time when the output timing of the next target sound comes.

14. The storage medium according to claim 13, wherein at the nomination range setting step, the computer keeps the width of the nomination range constant during a predetermined time period from the time when the output timing of the target sound comes.

15. The storage medium according to claim 13, wherein at the nomination range setting step, the computer changes the nomination range such that the width of the nomination range is decreased by a constant amount or at a constant rate with respect to elapse of time.

16. The storage medium according to claim 11, wherein
the music data includes data which indicates a tone color of each sound forming the melody of the predetermined piece of music,
the music playing apparatus further stores output possible range data in which an output possible range is associated with each tone color of sounds to be outputted, and
at the nomination range setting step, the computer sets the nomination range so as to be within an output possible range of an output possible range data which is associated with a tone color of the target sound.

17. The storage medium according to claim 3, wherein
the nominee setting step includes a nomination range setting step for setting as a nomination range a range which includes a second pitch which is the pitch of the next target sound, and
the nominee for the pitch of the ad-lib sound is set within the nomination range which is set at the nomination range setting step.

18. The storage medium according to claim 17, wherein at the nomination range setting step, the computer sets as the nomination range a range which has a predetermined width with the second pitch set as a center thereof.

19. The storage medium according to claim 17, wherein at the nomination range setting step, the computer sets the nomination range such that the width of the nomination range is gradually decreased as time proceeds during a target period from a time when the output timing of the target sound comes to a time when the output timing of the next target sound comes.

20. The storage medium according to claim 19, wherein at the nomination range setting step, the computer keeps the width of the nomination range constant during a predetermined time period from the time when the output timing of the target sound comes.

21. The storage medium according to claim 19, wherein at the nomination range setting step, the computer changes the nomination range such that the width of the nomination range is decreased by a constant amount or at a constant rate with respect to elapse of time.

22. The storage medium according to claim 17, wherein
the music data includes data which indicates a tone color of each sound forming the melody of the predetermined piece of music,
the music playing apparatus further stores output possible range data in which an output possible range is associated with each tone color of sounds to be outputted, and
at the nomination range setting step, the computer sets the nomination range so as to be within an output possible range of an output possible range data which is associated with a tone color of the target sound.

23. The storage medium according to claim 1, wherein
the music playing apparatus further stores chord data which indicates a chord sound used in the predetermined piece of music, and
at the ad-lib sound determination step, the computer determines the pitch of the ad-lib sound by selecting a sound from the chord sound of the predetermined piece of music which is defined in the chord data.

24. The storage medium according to claim 1, wherein
the music playing apparatus further stores scale data which indicates a scale sound of the predetermined piece of music, and
at the ad-lib sound determination step, the computer determines the pitch of the ad-lib sound by selecting a sound from the scale sound of the predetermined piece of music which is defined in the scale data.

25. A music playing apparatus for making a player play a melody of a predetermined piece of music, the music playing apparatus comprising:
music data storage memory for storing music data which indicates at least a pitch of each of sounds which form the melody of the predetermined piece of music and an output timing to output each of the sounds;
a detector for sequentially detecting, among the sounds included in the music data, a target sound which is a sound an output timing of which comes after start of playing by the music data;
input acceptance programmed logic circuitry for accepting an input from an input device of the music playing apparatus;
first sound output programmed logic circuitry for outputting the target sound in the case where the input accepted by the input acceptance programmed logic circuitry is a first input when or after the output timing of the target sound detected by the detector comes,
ad-lib sound determination programmed logic circuitry for determining a pitch of an ad-lib sound as an arbitrary sound in the case where the input accepted by the input acceptance programmed logic circuitry is a second or later input after the output timing of the target sound detected by the detector comes; and
second sound output programmed logic circuitry for outputting the ad-lib sound at the pitch which is determined by the ad-lib sound determination programmed logic circuitry.

* * * * *